United States Patent
Yoshiaki et al.

(10) Patent No.: US 7,526,433 B2
(45) Date of Patent: Apr. 28, 2009

(54) VIRTUAL CONTENT DISTRIBUTION SYSTEM

(75) Inventors: Iwata Yoshiaki, Neyagawa (JP);
Kajimoto Kazuo, Yokohama (JP);
Munetsugu Toshihiko, Katano (JP);
Nishitani Kazuhiro, Osaka (JP);
Tanikawa Kentaro, Kadoma (JP);
Tsusaka Yuko, Osaka (JP); Tokuda Hirokazu, Osaka (JP)

(73) Assignee: Panasonic Coporation, Osaka (JP)

( * ) Notice: Subject to any disclaimer, the term of this patent is extended or adjusted under 35 U.S.C. 154(b) by 1392 days.

(21) Appl. No.: 10/232,679

(22) Filed: Sep. 3, 2002

(65) Prior Publication Data

US 2003/0056222 A1 Mar. 20, 2003

(30) Foreign Application Priority Data

Sep. 4, 2001 (JP) .............................. 2001-266961

(51) Int. Cl.
*G06Q 99/00* (2006.01)
(52) U.S. Cl. ........................................................ 705/1
(58) Field of Classification Search ...................... 705/1
See application file for complete search history.

(56) References Cited

U.S. PATENT DOCUMENTS

| | | | | | |
|---|---|---|---|---|---|
| 5,027,400 | A | * | 6/1991 | Baji et al. | 725/116 |
| 5,886,731 | A | * | 3/1999 | Ebisawa | 725/32 |
| 6,760,916 | B2 | * | 7/2004 | Holtz et al. | 725/34 |
| 7,113,983 | B1 | * | 9/2006 | Terada et al. | 709/219 |
| 2002/0092019 | A1 | * | 7/2002 | Marcus | 725/37 |
| 2002/0103928 | A1 | * | 8/2002 | Singal et al. | 709/238 |
| 2002/0152318 | A1 | * | 10/2002 | Menon et al. | 709/231 |
| 2005/0281535 | A1 | * | 12/2005 | Fu et al. | 386/69 |
| 2006/0248016 | A1 | * | 11/2006 | Ginter et al. | 705/54 |

FOREIGN PATENT DOCUMENTS

| | | |
|---|---|---|
| EP | 0 656 728 | 6/1995 |
| EP | 1 016 991 | 7/2000 |
| JP | 7-203420 | 8/1995 |
| JP | 9-130346 | 5/1997 |
| JP | 9-327002 | 12/1997 |
| JP | 11-155137 | 6/1999 |
| JP | 3002471 | 11/1999 |
| JP | 2000-13767 | 1/2000 |
| JP | 2000-50233 | 2/2000 |
| JP | 2000-134588 | 5/2000 |
| JP | 2000-250944 | 9/2000 |
| JP | 2000-261784 | 9/2000 |

\* cited by examiner

*Primary Examiner*—Jonathan Ouellette
(74) *Attorney, Agent, or Firm*—Wenderoth, Lind & Ponack, L.L.P.

(57) ABSTRACT

A content distribution system including a server device for selecting and distributing video scenes according to a user request, and a terminal device for receiving the video scenes from the server device. The server device stores a plurality of content files. Each content file includes a plurality of pieces of scene data together with scene additional information regarding playback of each piece of scene data. The server device selects pieces of scene data matching the user request, reads scene additional information from each content file containing the selected pieces of scene data, generates, based on the read scene additional information, selected-scene additional information, and transmits the selected pieces of scene data in association with the generated selected-scene additional information. The terminal device receives and stores the selected pieces of scene data and the selected-scene additional information.

9 Claims, 27 Drawing Sheets

FIG.3

Input Your Profile: Please Check the Appropriate Boxes.

(1) Gender  ☑ Male   ☐ Female (2) Age  ☐ 19 or Younger  ☑ 20-30
         ☐ 40-50          ☐ 60 or Older (3) Hobby  ☑ Cars   ☐ Movies, Entertainment  ☐ Gourmet
           ☐ Music  ☐ Internet               ☐ Shopping

[ OK ]                                    [ Cancel ]

Program Genre List: Please Check the Genres You Like.

| ☐ News | ☑ Sports | ☐ Music |
| ☐ Movies | ☐ Dramas | ☐ Variety Shows |
| ☐ Documentaries | ☐ Educational | ☐ Cooking |
| ☐ Travel | ☐ Shopping | ☐ Lifestyle Program |

OK    Cancel

Keyword List for Sports: Please Check the Keywords You Like

| ● Professional Baseball | ○ Soccer | ○ Tennis |
| ● Major League Baseball | ○ World Soccer | ○ Fishing |
| ○ Water Sports | ○ Golf | ○ Mountain Climbing |
| . . . . | . . . . | . . . . |

OK  Cancel

410 Content-Structure Table

| Playback No. | Content ID | Start-Frame No. | End-Frame No |
|---|---|---|---|
| 1 | Program 01.mp4 | 1 | 18000 |
| 2 | CM 01.mp4 | 1 | 300 |
| 3 | Program 01.mp4 | 18001 | 36000 |
| 4 | CM 03.mp4 | 501 | 750 |
| 5 | Program 05.mp4 | 1201 | 25800 |
| 6 | CM 09.mp4 | 901 | 1400 |

| Content ID | Frame No. | Genre | Keyword |
|---|---|---|---|
| Program 01.mp4 | 1~18000 | Sports | Professional Baseball |
| Program 01.mp4 | 18001~36000 | Sports | Major League Baseball |
| Program 02.mp4 | 1~20000 | Travel | Hot Springs |
| Program 02.mp4 | 20001~38000 | Cooking | Restaurants |
| ... | ... | ... | ... |

515

511 Program Table

FIG.10

| Content ID | Frame No. | Gender | Age | Hobby |
|---|---|---|---|---|
| CM 01.mp 4 | 1~300 | Male | 20-30 | Cars |
| CM 01.mp 4 | 301~600 | Male | 30-40 | Internet |
| CM 02.mp 4 | 1~300 | Female | 19 or Younger | Music |
| ... | ... | ... | ... | ... |

524 (columns after Content ID)

512 CM Table

651

Virtual Content Header Information
Compressed Format: MPEG4
Screen Size: 352-wide by 288-high Pixels
Number of Frames: 61750 Frames
File Size: 334800512 Bytes

FIG.15

661 Virtual Content Index Information

| Frame No. | Byte Location |
|---|---|
| 1 | 512 |
| ⋮ | ⋮ |
| 18000 | 72000112 |
| 18001 | 72000512 |
| ⋮ | ⋮ |
| 19000 | 76000112 |
| ⋮ | ⋮ |

671 Virtual Content Transmitting Timing Information

| Frame No. | Timing |
|---|---|
| 1 | -0.4sec |
| ⋮ | ⋮ |
| 18000 | -0.1sec |
| 18001 | -0.5sec |
| ⋮ | ⋮ |
| 19000 | -0.2sec |
| ⋮ | ⋮ |

801 Performer Information

| First-Appearance Frame | Last-Appearance Frame | Performer |
|---|---|---|
| 1 | 100 | A |
| 1 | 300 | B |
| 250 | 500 | C |

811

VIRTUAL CONTENT DISTRIBUTION SYSTEM

This application is based on an application No. 2001-266961 filed in Japan, the content of which is hereby incorporated by reference.

BACKGROUND OF THE INVENTION (1) Field of the Invention

The present invention relates to a content distribution technique for distributing contents in accordance with a user request.

(2) Description of the Related Art

Recently, extensive study has been conducted on techniques for distributing contents from a server device to a terminal device over a network in accordance with a user request. A server device stores a plurality of content files, and each content file contains a plurality of pieces of content data. The server device receives a user request, which is a keyword designated by the user, from the terminal device, and selects pieces of content data based on the keyword, and transmits the selected content data to the terminal device.

There are two types of content distribution techniques, a streaming type of content distribution and a download type of content distribution.

In the streaming type technique, a server device sequentially transmits, to a terminal device via a network, only content data out of all the content data contained in a plurality of content files stored therein. The terminal device sequentially plays back the content data as it is received. Further, according to the streaming type technique, received content data is not accumulated in the terminal device, so that it is required to newly receive content data from the server device for every viewing.

According to the download type technique, on the other hand, a terminal device accumulates content data transmitted from a server device. Thus, it is possible for the terminal device to play back the content data some time after receiving the content data. One problem associated with the download type technique is that when the terminal device receives a plurality of pieces of content data, the playback order and other information regarding the plurality of pieces of content data need to be managed. This management requires the user to go though troublesome operations. In addition, although the content data matching the keyword is merely a part of a content file, the server device is still required to transmit the entire content file. This gives rise to another problem that content data that is not requested by the user is transmitted.

In one attempt to address the above limitations, the server device regenerates content data to be transmitted as a single file, and transmits the regenerated file to the terminal device. However, this attempt is not practical especially for the server device operating on a network to which a number of terminal devices are connected because it is inevitable that a great portion of disk capacity of the server device is consumed.

SUMMARY OF THE INVENTION

In view of the above problems, an object of the present invention is to provide a virtual content distribution system and a virtual content distribution server device each capable of transmitting content data, to terminal devices connected via a network, in accordance with requests received from a respective terminal device. Each terminal device is allowed to play back the received content data at a later time.

To achieve the above stated object, according to one aspect of the present invention, a content distribution system is composed of a server device for selecting and distributing video scenes, and a terminal device for receiving the video scenes from the server device.

The server device stores a plurality of content files. Each content file contains a plurality of pieces of scene data together with scene additional information (e.g. index information) regarding playback of the scene data contained in the content file. Further, the server device selects, from the scene data contained in the content files, pieces matching the user request, reads the scene additional information from content files that contain the selected scene data, and generates, based on the read scene additional information, selected-scene additional information. Still further, the server device transmits to the terminal device the selected scene data in association with the generated selected-scene additional information.

The terminal device receives and stores the selected pieces of scene data and the selected-scene additional information.

With this construction, the content distribution system selects a plurality of scenes according to a request received from a terminal device, thereby generating, for each user, a separate content that complies with each user request. Further, the content distribution system generates virtual scene additional information regarding playback of the selected pieces of scene data, and transmits the selected pieces of scene data in association with the generated virtual scene additional information. This allows the terminal device to receive and store the plurality of pieces of scene data, and to perform time-shift viewing, i.e., playback of the received pieces of scene data at a later time, using the virtual scene additional information.

Further, according to another aspect of the present invention, a server device is for selecting and transmitting video scenes according to a user request received from a terminal device.

The server device stores a plurality of content files. Each content file contains a plurality of pieces of scene data together with scene additional information regarding playback of the scene data contained in the content file and each piece of scene data includes a plurality of pieces of frame data. Further, the server device selects, from the scene data contained in the content files, pieces matching the user request, reads the scene additional information from content files that contain the selected scene data, and generates, based on the read scene additional information, selected-scene additional information. Still further, the server device transmits to the terminal device the selected scene data in association with the generated selected-scene additional information.

With this construction, the server device selects a plurality of scene data according to a user request, thereby generating, for each user, a separate content that complies with each user request. Further, the server device generates virtual scene additional information regarding playback of the selected pieces of scene data, and transmits to the terminal device the selected pieces of scene data in association with the generated virtual scene additional information. This allows the terminal device to receive and store the plurality of pieces of scene data, and to perform time-shift viewing, i.e., playback of the received pieces of scene data at a later time, using the virtual scene additional information.

Here, the server device may store, as the scene additional information, index information showing, for each piece of frame data contained in the scene data, a corresponding frame number and a corresponding location within a respective content file. Further, the server device may generate, as the selected-scene additional information, selected-scene index information showing frame numbers and locations of each piece of frame data contained in the selected scene data. Here, the frame numbers are serially assigned to each piece of frame data, and the locations are where each piece of frame data is within the plurality of selected pieces of scene data.

With this construction, the server device generates virtual index information, and transmits the selected pieces of scene data in association with the generated virtual index information. This allows the terminal device to, upon receipt of the pieces of scene data and the virtual index information, play back the scene data by way of forward quick-scan, immediate access to the start of a specific piece of scene data, and the like.

Here, each piece of scene data stored in the server device may be identified by a scene ID. Further, the server device may store, for each piece of scene data stored in the storing unit, a corresponding scene ID in association with a corresponding piece of scene-related information, and receive from the terminal device, as the request, a selection condition used for the scene data selection. Still further, the server device may extract from the scene IDs stored in the database sub-unit, scene IDs that correspond to each piece of scene-related information matching the selection condition, and obtain from the storing unit pieces of scene data identified by the extracted scene IDs.

With this construction, the server device has the database unit storing information related to each piece of the scene data, so that it is possible to retrieve scene data that complies with the request received from the terminal device.

Here, the server device may serially assign to the extracted scene IDs playback numbers showing playback order, generate a structure table composed of the playback numbers and the extracted scene IDs, so that the obtaining of the scene data may be performed with reference to the generated structure table.

With this construction, the server device generates a structure table in which scene IDs corresponding to pieces of scene data matching the request received from the user are associated with the playback numbers representing the playback order. Consequently, the server device is allowed to obtain the pieces of scene data according to the playback order.

Here, the server device may store, as the scene additional information, index information and timing information both for each piece of frame data contained in the scene data. The index information shows a corresponding frame number and a corresponding location within a respective content file, and the timing information shows a corresponding frame number and a corresponding transmitting timing. Further, the server device may generate, as the selected-scene additional information, selected-scene index information and selected-scene timing information. The selected-scene index information shows frame numbers serially assigned to each piece of frame data within the selected pieces of scene data, and locations where each piece of frame data is within the selected pieces of scene data. The selected-scene timing information shows the frame numbers, and transmitting timings at which each frame data within the selected pieces of scene data is to be transmitted. Further, the server device may transmit, to the terminal device, the selected pieces of scene data in association with the selected-scene index information. The transmission of the selected pieces of scene data may be sequentially performed according to the selected-scene timing information.

With this construction, the server device distributes the selected pieces of scene data to a terminal device by way of the streaming technique, and also transmits the generated virtual index information to the terminal device. Consequently, the terminal device receives the plurality of pieces of scene data by way of the streaming type technique, and is still allowed to play back the received pieces of scene data at a later time with the use of the virtual index information. Further, the terminal device is allowed to play back the scene data by way of forward quick-scan, immediate access to the start of a specific piece of scene data, and the like.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 is a view showing a profile-input screen 110 displayed on the client 10;

FIG. 4 is a view showing a genre-list screen 130 displayed on the client 10;

FIG. 5 is a view showing a keyword-selection screen 150 displayed on the client 10;

FIG. 7 is a view showing the data structure of a content-structure table 410 generated by the agent 40;

FIG. 10 is a view showing the data structure of a CM table 512 stored in the DB server 50;

FIG. 15 is a view showing the data structure of virtual content index information 661 generated by the virtual content output server 60;

DETAILED DESCRIPTION OF THE INVENTION

First Preferred Embodiment

Referring now to the accompanying drawings, description is given to a virtual content distribution system 1 as a first preferred embodiment of the present invention.

In the virtual content distribution system 1, a server stores contents, which are a plurality of programs and a plurality of commercial messages (herein after referred to as CMs) which include video data and audio data. Each program is composed of a plurality of program scenes, and each CM is composed of a plurality of CM scenes. Each program scene as well as each CM scene is a sequence of frames that are linked to form a sensible video scene. Further, each program scene has a keyword used to distribute the program scene that complies with a user request, whereas each CM scene has a piece of profile information used to distribute the CM scene that complies with user attribute.

The server selects a plurality of scenes from among scenes included in a plurality of contents in accordance with a user request, and transmits the selected scenes to a client.

Hereinafter, the virtual content distribution system 1 is described in detail.

<Construction>

First, description is given to the construction of the virtual content distribution system 1.

Figure 1:
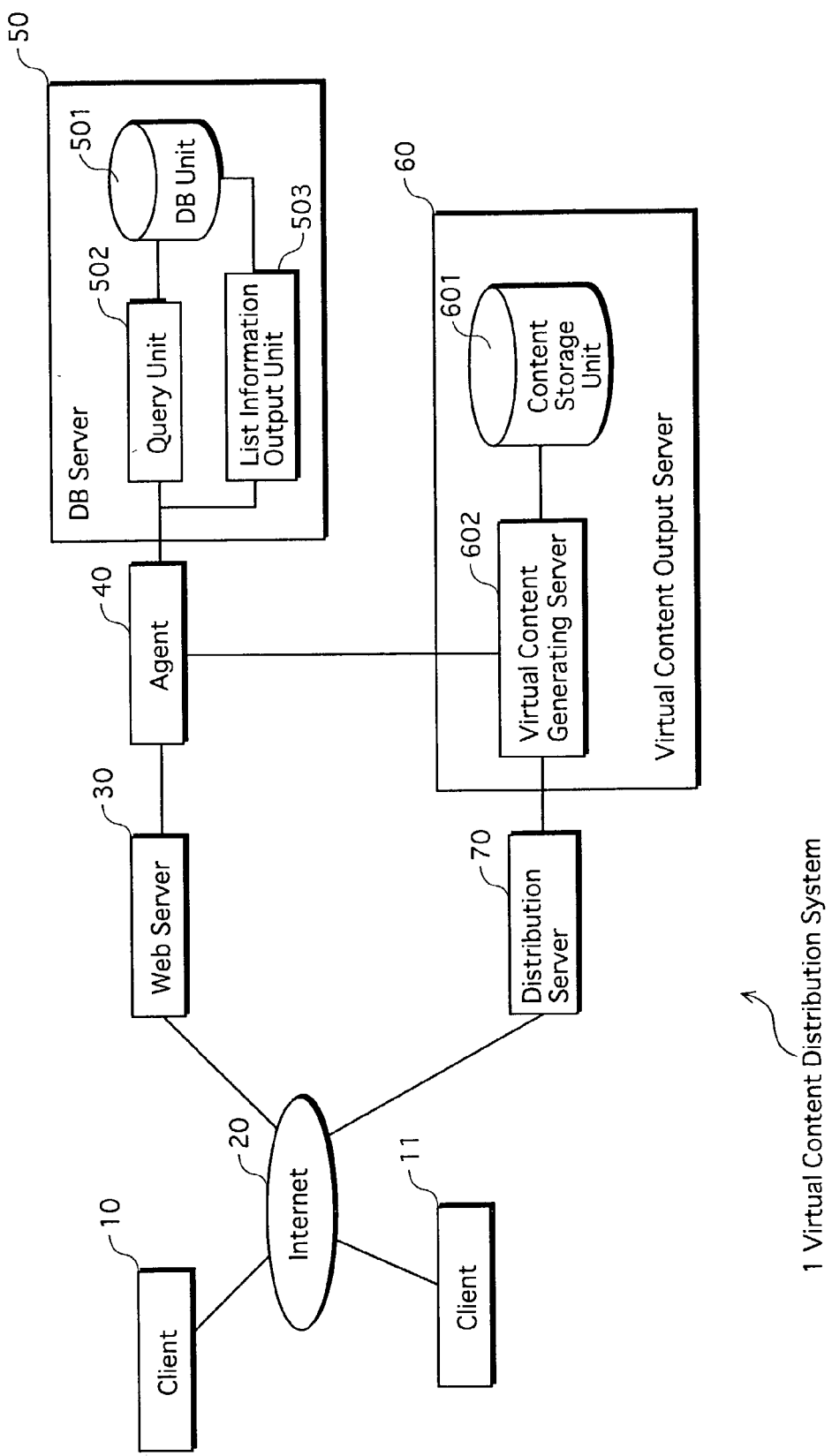
FIG. 1 is a view showing the construction of a virtual content distribution system 1.

As shown in FIG. 1, the virtual content distribution system 1 is composed of a client 10, a client 11, the Internet 20, a Web server 30, an agent 40, a DB server 50, a virtual content output server 60, and a distribution server 70.

The client 10 and the client 11 are terminal devices owned by users of the virtual content distribution system 1, and separately connected to the Web server 30, and the distribution server 70 via the Internet 20. The Web sever 30, the agent 40, the DB server 50, the virtual content output server 60, and the distribution server 70 are the devices owned by a service provider of the virtual content distribution system 1, and mutually connected via a LAN (Local Area Network).

1. Client 10

Here, description is given to the construction of the client 10. The client 10 receives input made by a user operation and transmits the received input to the Web server 30 via the Internet 20. In addition, the client 10 downloads a virtual content from the distribution server 70 via the Internet 20.

Figure 2:
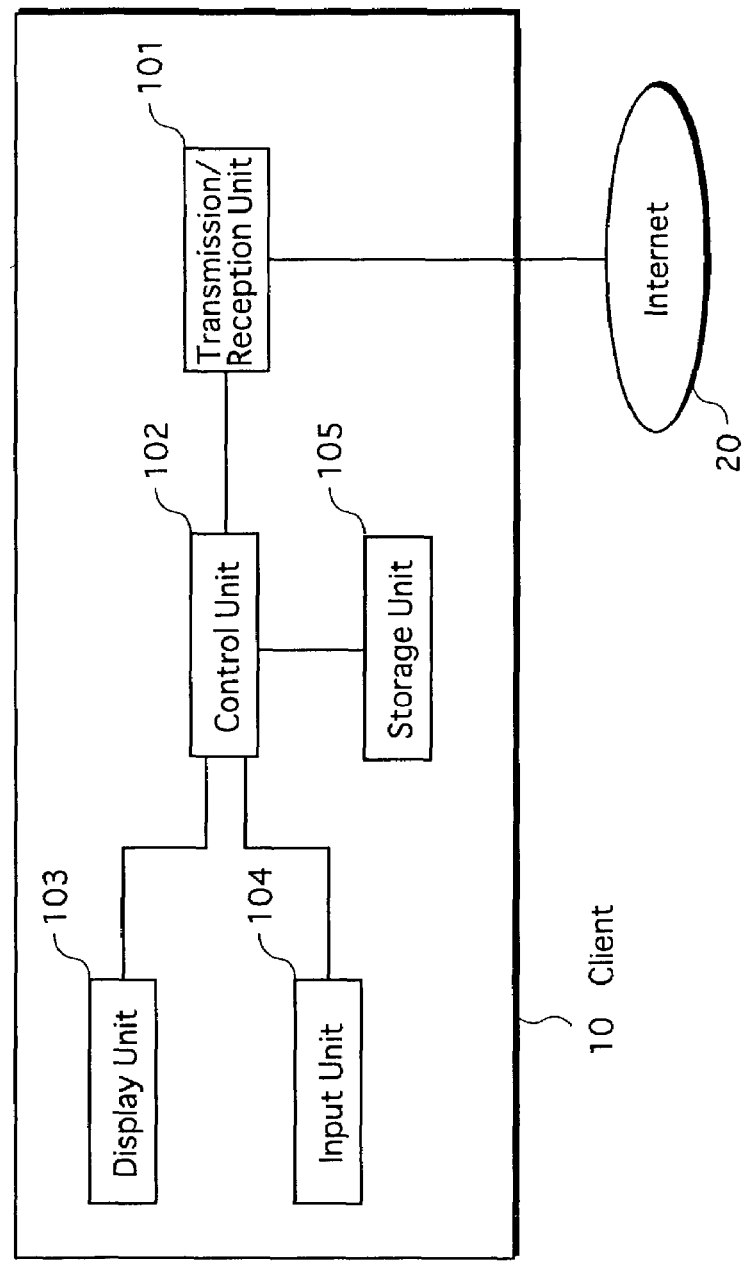
FIG. 2 is a view showing the construction of a client 10.

FIG. 2 is a view showing the construction of the client 10. As shown in the figure, the client 10 is composed of a transmission/reception unit 101, a control unit 102, a display unit 103, an input unit 104, and a storage unit 105. Specifically, the client 10 is a computer system composed of a microprocessor, ROM, RAM, a hard disk unit, a keyboard, a mouse, and possibly other components. In this preferred embodiment, the client 10 is particularly assumed to be a personal computer.

(1) Transmission/Reception Unit 101

The transmission/reception unit 101 performs transmission of information via the Internet 20 between the control unit 102 and the Web server 30 as well as between the control unit 102 and the distribution server 70. Specifically, the transmission/reception unit 101 receives screen control information from the Web server 30, and outputs the received screen control information to the control unit 102. The screen control information received from the Web server 30 by the transmission/reception unit 101 includes profile-input screen control information, genre-list screen control information, and keyword-selection screen control information. The transmission/reception unit 101 receives from the control unit 102, inputted information and transmits the received information to the Web server 30. In addition, the transmission/reception unit 101 receives a virtual content from the distribution server 70, and outputs the received virtual content to the control unit 102.

(2) Control Unit 102

Specifically, the control unit 102 is composed of a microprocessor, RAM, and possibly other components. The RAM stores a computer control program. The control unit 102 controls the client 10 by the microprocessor executing the computer control program.

The control unit 102 receives the screen control information from the transmission/reception unit 101, generates a screen based on the received screen control information, and outputs the generated screen to the display unit 103. The screens generated by the control unit 102 include a profile-input screen, a genre-list screen, and a keyword-selection screen. In addition, the control unit 102 receives from the input unit 104 the information inputted by user operations, and outputs the inputted information to the transmission/reception unit 101. The control unit 102 also receives the virtual content from the transmission/reception unit 101, and writes the received virtual content to the storage unit 105.

(3) Display Unit 103

The display unit 103 is provided with a display panel, and receives the screen generated by the control unit 102, thereby displaying the received screen on the display panel. In addition, the display unit 103 displays a screen in accordance with the user operations received via the input unit 104.

Screens displayed by the display unit 103 are the profile-input screen 110, the genre-list screen 130, and the keyword-selection screen 150.

Profile-Input Screen 110

The profile-input screen 110 is used for a user to input user profile. Items to be inputted include "gender", "age", and "hobby". User profile inputted herein is used when generating a virtual content including CMs that comply with the attribute of the user.

Note that a "virtual content" used herein refers to a set of data including a plurality of selected scenes, which are likely to be contained in different content files, as well as information showing, for example, the playback order of the plurality of scenes. Further, "to generate a virtual content" does not refer to generate a new content file using a plurality of scenes. Rather, "to generate a virtual content" refers to the series of operations to extract a plurality of scenes from a plurality of different content files, generate information showing playback order of the extracted scenes and the like, and establish association between the generated information and the extracted scenes. Hereinafter, these two terms are used as set forth.

As shown in FIG. 3, the profile-input screen 110 includes check buttons to select: "Male" or "Female" for gender; "19 or younger", "20-30", "40-50", or "60 or older" for age; and "Cars", "Movies and Entertainment", "Gourmet", "Music", "Internet", or "Shopping" for hobby. Additionally, the profile-input screen 110 includes an "OK" button and a "Cancel" button to submit or cancel the selection. Upon receipt of an input selecting a check button for each item via the input unit 104, the display unit 103 displays a checkmark in each selected check button. Note that only one check button is possibly selected for each item, so that a formerly selected check button is automatically deselected when another check button is selected for the same item. The profile-input screen 110 in FIG. 3 shows that "Male", "20-30", and "Cars" have been selected for gender, age, and hobby, respectively.

Genre-List Screen 130

The genre-list screen 130 is used when a user selects a desired genre of programs to be distributed. Programs are classified into twelve genres, which are "News", "Sports", "Music", "Movies", "Dramas", "Variety Shows", "Documentaries", "Educational", "Cooking", "Travel", "Shopping", and "Lifestyle Programs". As shown in FIG. 4, the genre-list screen 130 includes a list of the above genres and check buttons corresponding to each genre, so that a genre is selected using the check buttons. Additionally, the genre-list screen 130 includes an "OK" button and a "Cancel" button to submit or cancel the selection. Upon receipt of an input selecting a check button via the input unit 104, the display unit 103 displays a checkmark in the selected check button. Note that only one check button is possibly selected in the genre-list, so that a formerly selected check button is automatically deselected when another check button is selected. The genre-list screen 130 in FIG. 4 shows that the "Sports" genre has been selected.

Keyword-Selection Screen 150

The keyword-selection screen 150 is a screen displayed in response to the user input selecting the "Sports" genre in the genre-list screen 130. The keyword-selection screen 150 is used when the user narrows down the above-selected genre in further detail using a keyword. Keywords for the "Sports" genre include "Professional Baseball", "Major League Baseball", "Soccer", and "Tennis". As shown in FIG. 5, the keyword-selection screen 150 includes a list of keywords and radio buttons corresponding to each keyword, so that a keyword is selected using the radio buttons. Additionally, the keyword-selection screen 150 includes an "OK" button and a "Cancel" button as well as a scroll bar for scrolling up and down the screen being displayed. Upon receipt of an input selecting a radio button via the input unit 104, the display unit 103 displays a specific mark in the selected radio button. Note that one or more radio buttons may be simultaneously selected. The keyword-selection screen 150 in FIG. 5 shows that the "Professional Baseball" and "Major League Baseball" have been selected.

Although this specific keyword-selection screen 150 is for the "Sports" genre, there are keyword-selection screens for all of the twelve genres included in the genre-list screen 130 shown in FIG. 4. The display unit 103 displays a keyword-selection screen that corresponds to the genre selected in FIG. 4.

(4) Input Unit 104

Specifically, the input unit 104 includes a keyboard, a mouse or the like. When a user operates the keyboard, the mouse, or the like, the input unit 104 outputs to the display unit 103 a command corresponding to the user operation. Further, the input unit 104 generates information corresponding to the user operation, and outputs the generated information to the control unit 102.

(5) Storage Unit 105

The storage unit 105 is a hard disk unit and stores a virtual content that the control unit 102 receives from the distribution server 70 via the transmission/reception unit 101 and the Internet 20. Specifically, a virtual content is composed of a plurality of frames in association with virtual content header information as well as virtual content additional information.

The client 11 is a terminal device owned by a different user than the one who owns the client 10, and is connected to the Web server 30 and to the distribution server 70 via the Internet 20. The client 11 receives a user input, and transmits the received input to the Web server 30 via the Internet 20. In addition, the client 11 receives a virtual content from the distribution server 70 via the Internet 20, and stores the received virtual content. Since the client 11 is identical to the client 10 in construction, detailed description thereof is omitted.

2. Web Server 30

Now, a description is given regarding the construction of Web server 30.

Specifically, the Web server 30 is a computer system composed of a microprocessor, ROM, RAM, a hard disk unit, a LAN connection unit, and possibly other components. The Web server 30 is separately connected to the client 10 and the client 11 via the Internet 20, and also to the agent 40 via the LAN. Note that the construction of the Web server 30 is not illustrated.

The Web server 30 transmits information to or from the client 10 via the Internet 20, and also transmits information to or from the agent 40 via the LAN. To be more specific, the Web server 30 receives information regarding genre-list as well as information regarding keyword-list from the agent 40 via the LAN, and converts the received genre-list information and keyword-list information into an HTML format, thereby generating screen control information. The Web server 30 then transmits the generated screen control information to the client 10 via the Internet 20. In addition, the Web server 30 receives, from the client 10, inputted information regarding profile, genre, and keyword(s). In one example, the Web server 30 receives information showing "male/20-30/cars" as the profile, "Sports" as the genre, and "Professional Baseball/Major League Baseball" as the keywords. The Web server 30 then outputs the received information to the agent 40 via the LAN.

3. Agent 40

Now, description is given to the construction of the agent 40. The agent 40 generates, according to a request from the client 10, a content-structure table showing the structure of a virtual content to be distributed to the client. The agent 40 then outputs the generated content-structure table to the virtual content output server 60.

Figure 6:
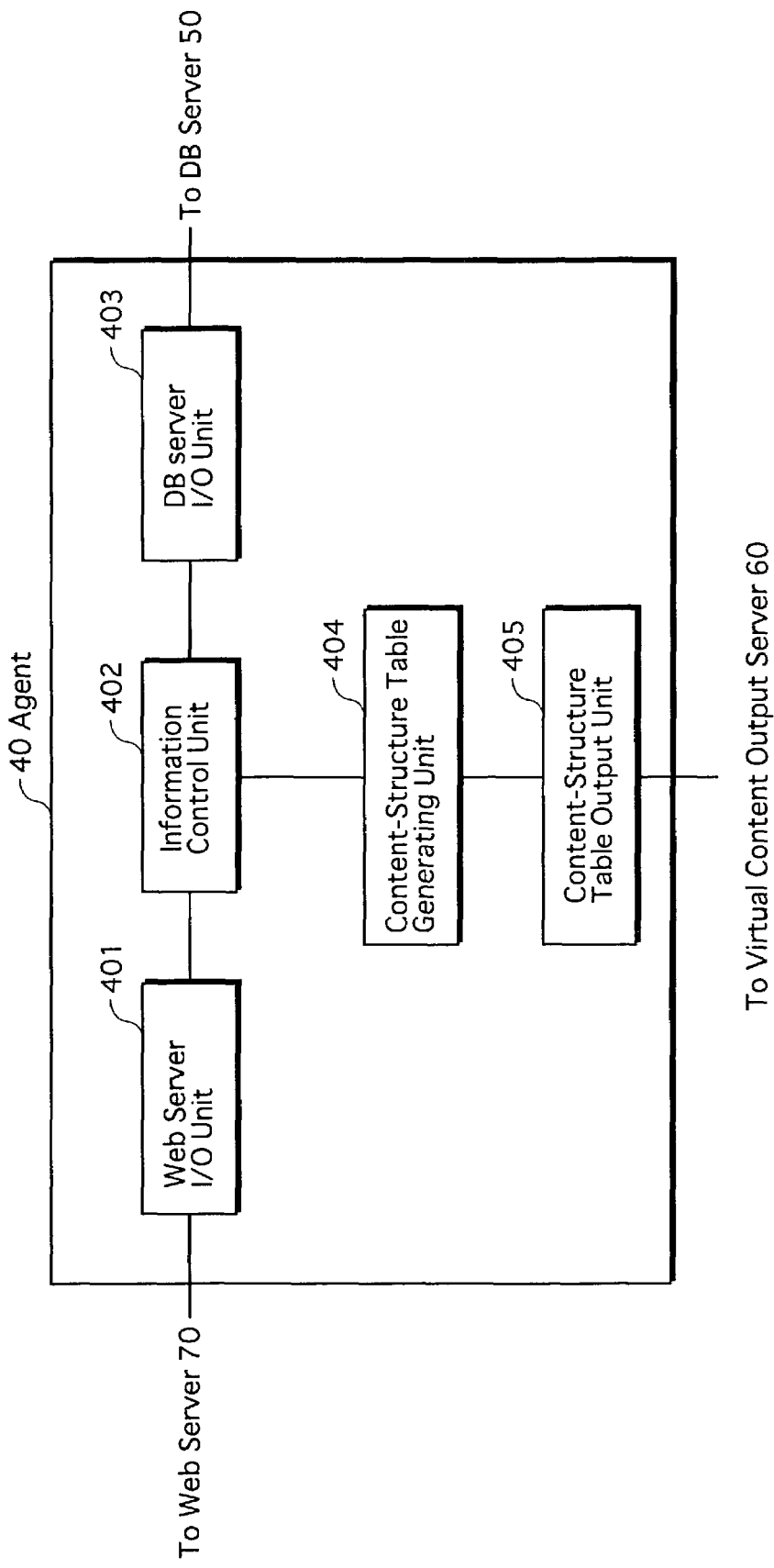
FIG. 6 is a view showing the construction of an agent 40.

The agent 40, as shown in FIG. 6, is composed of a Web server I/O unit 401, an information control unit 402, a DB server I/O unit 403, and a content-structure table generating unit 404, and a content-structure table output unit 405. Specifically, the agent 40 is a computer system composed of a microprocessor, ROM, RAM, a hard disk unit, a LAN connection unit, and possibly other components, and is separately connected via the LAN to the Web server 30, the DB server 50, and the virtual content output server 60.

(1) Web Server I/O Unit 401

The Web sever I/O unit 401 includes a LAN connection unit, and performs transmission of information between the Web server 30 and the information control unit 402. Specifically, the Web sever I/O unit 401 receives the genre-list information and the keyword-list information from the information control unit 402, and outputs the received genre-list information and keyword-list information to the Web server 30. In addition, the Web server I/O unit 401 receives from the Web server 30 the inputted information regarding profile, genre, and keyword(s), and outputs the received information to the information control unit 402. In one example, the inputted information shows "male/20-30/cars" as the profile, "Sports" as the genre, and "Professional Baseball/Major League Baseball" as the keywords.

(2) Information Control Unit 402

The information control unit 402 receives the information from the Web server I/O unit 401 and the DB server I/O unit 403, and identifies the received information to perform suitable processing. To be more specific, the information control unit 402 receives from the DB server I/O unit 403 the genre-list information and the keyword-list information, and outputs the received genre-list information and keyword-list information to the Web server I/O unit 401. In addition, the information control unit 402 receives, from the Web server I/O unit 401, the inputted information, and outputs the received information to the DB server I/O unit 403. Further, the information control unit 402 receives from the DB server I/O unit 403 a plurality of content IDs each associated with a pair of frame numbers, and outputs the received content IDs and frame numbers to the content-structure table generating unit 404. Each content ID and an associated pair of frame numbers together constitute information specifying the location of one scene, and used when generating a content-structure table. The content-structure table is described later in detail.

(3) DB Server I/O Unit 403

The DB server I/O unit 403 includes a LAN connection unit, and performs transmission of information between the DB server 50 and the information control unit 402. To be more specific, the DB server I/O unit 403 receives the genre-list information and the keyword-list information both outputted from the DB server 50, and outputs the received genre-list information and keyword-list information to the information control unit 402. In addition, the DB server I/O unit 403 receives the content IDs each associated with a pair of frame numbers outputted from the DB server 50, and outputs the received content IDs and frame numbers to the information control unit 402. Further, the DB server I/O unit 403 receives from the information control unit 402 the inputted information, and generates retrieval information based on the received information, and outputs the generated retrieval information to the DB server 50. In one specific example, the DB server I/O unit 403 receives the inputted information showing "Male/20-30/Cars" as the profile, and "Sports" as the genre, and "Professional Baseball/Major League Baseball" as the keywords. Upon receipt of the above information, the DB server I/O unit 403 generates retrieval information that includes a command directing to retrieve CM data using the profile "Male/20-30/Cars", and a command directing to retrieve program data using the keywords "Professional Baseball/Major League Baseball". Note that the CM data and the program data will be described later in detail.

(4) Content-Structure Table Generating Unit 404

The content-structure table generating unit 404 is composed of a microprocessor, RAM, and possibly other components. The content-structure table generating unit 404 receives, from the information control unit 402, a plurality of content IDs together with the associated pairs of frame numbers, and then generates a content-structure table in the following manner. That is, the content-structure generating unit 404 selects, from among the plurality of received content IDs, one content ID that includes a character string "Program", and writes the selected content ID. Next, the content-structure generating unit 404 writes the pair of frame numbers corresponding to the selected content ID as a start-frame number and an end-frame number. The start frame number is first written following the already written content ID, and then the end frame number is written following the already written start-frame number. The content-structure table generating unit 404 then selects, from among the plurality of received content IDs that remain non-selected, another content ID that includes a character string "CM", and similarly writes the thus selected content ID, a corresponding start-frame number, and a corresponding end-frame number in the stated order following the already written information. The content-structure generating unit 404 then selects, from among the plurality of received content IDs that still remain non-selected, another content ID that includes a character string "Program", and similarly writes the thus selected content ID, a corresponding start-frame number, and a corresponding end-frame number in the stated order following the two sets already written information. In this manner, the content-structure table generating unit 404 alternately writes a content ID that includes a character string "Program", and a content ID that includes a character string "CM" along with the irrespective start-frame numbers and end-frame numbers until all the received content IDs are written. Upon writing all the content IDs together with their respective start-frame numbers and end-frame numbers, the content-structure table generating unit 404 serially assigns a playback number to each content ID in the order that the content IDs are written. The assigned playback number represents the order that the content is to be played back. FIG. 7 shows one example of the content-structure table generated by the content-structure table generating unit 404. The content-structure table 410 shown in the figure is composed of six content IDs and their respective start-frame numbers and end-frame numbers. The content-structure table generating unit 404 outputs the generated content-structure table 410 to the content-structure table output unit 405.

(5) Content-Structure Table Output Unit 405

The content-structure table output unit 405 includes a LAN connection unit. The content-structure table output unit 405 receives the content-structure table from the content-structure table generating unit 404, and outputs the received content-structure table to the virtual content output server 60 via the LAN.

4. DB Server 50

Now, description is given to the structure of the DB server 50. The DB server 50 is a device that stores information necessary to generate a virtual content according to a user request so that the virtual content is composed of programs that the user has requested and CMs that comply with the user profile.

Figure 8:
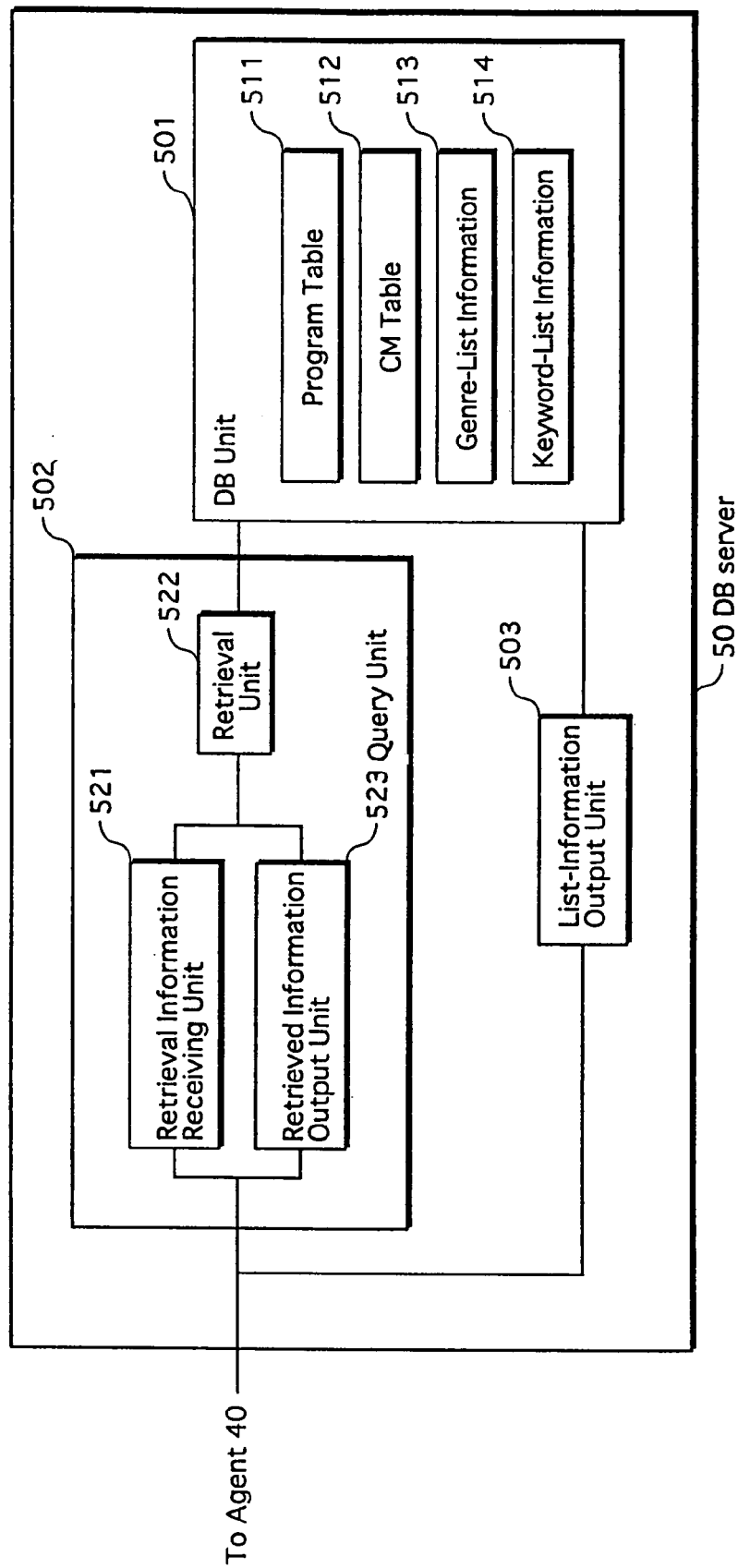
FIG. 8 is a view showing the construction of the DB server 50.

As shown in FIG. 8, the DB server 50 is composed of a DB unit 501, a query unit 502, and a list information output unit 503. The query unit 502 further includes a retrieval information receiving unit 521, a retrieval unit 522, and a retrieved information output unit 523. Specifically, the DB server 50 is a computer system composed of a microprocessor, ROM, RAM, a hard disk unit, a LAN connection unit, and possibly other components, and is connected to the agent 40 via the LAN.

(1) DB Unit 501

The DB unit 501 is a hard disk unit, and stores, as shown in FIG. 8, a program table 511, a CM table 512, genre-list information 513, and keyword-list information 514.

Figure 9:
FIG. 9 is a view showing the data structure of a program table 511 stored in the DB server 50.

FIG. 9 shows the data structure of the program table 511. As shown in the figure, the program table 511 is composed of a plurality of pieces of program-scene information. Each piece of program-scene information corresponds to one program scene, and is composed of a content ID of a content in which the program scene is included, a pair of frame numbers, a genre, and a keyword. FIG. 10 shows the data structure of the CM table 512. As shown in the figure, the CM table 512 is composed of a plurality of pieces of CM-scene information. Each piece of CM-scene information corresponds to one CM scene, and is composed of a content ID of a content in which the CM scene is included, a frame number, a gender, an age, and a hobby. Note that each pair of frame numbers, which is included in each piece of program-scene information or CM-scene information, is composed of two frame numbers showing a "start-frame number" and an "end-frame number" of a corresponding scene.

First, description is given to a content. The virtual content output server 60 stores a plurality of contents each of which is classified into either "program" or "CM". Each program is composed of a plurality of program scenes, and each CM is composed of a plurality of CM scenes. Each program scene and each CM scene are respectively composed of a plurality of frames.

Now, description is given to program scenes and CM scenes.

Each program scene has one genre and one keyword, which is information used to select a program scene that complies with a request from a client. The genre that each program scene has is one of "News", "Sports", "Music", "Movies", "Dramas", "Variety Shows", "Documentaries", "Educational", "Cooking", "Travel", "Shopping", or "Lifestyle Programs", and the keyword serves as detailed classification of each genre. For example, keywords for the "Sports" genre may include "Professional Baseball" and "Major League Baseball", while keywords for the "Cooking" genre may include "Cooking Lesson (Basic Japanese Food)" and "Restaurants". Each program scene has one of those keywords that correspond to the respective genre. Each piece of program-scene information is a collection of the above information items compiled into a database. In one example, the piece of program-scene information 515 shown in FIG. 9 is composed of the content ID: Program 01.mp4, the frame number: 1-18000, the genre: Sports, and the keyword: Professional Baseball. The content ID uniquely identifies the content in which the corresponding program scene is included, out of the plurality of contents stored in the virtual content output server 60. When the content is a program, the content ID starts with the character string "Program." The pair of frame numbers is composed two frame numbers showing how many frames in the entire content before the first frame and the last frame of the corresponding scene. The genre and the keyword are as described above.

Each CM scene has information that is used to select the CM scene according to the user attribute. To be more specific, each CM scene has information regarding a gender, an age, and a hobby each of which defines a suitable user to whom the CM scene is to be distributed. The gender assigned to each CM scene is either "Male" or "Female", the age is one of "19 or younger", "20-30", "40-50", or "60 or older", and the hobby is one of "Cars", "Movies and Entertainment", "Gourmet", "Music", "Internet", or "Shopping". Each piece of CM-scene information is a collection of the above data items compiled into a database. In one example, the piece of CM-scene information 524 in FIG. 10 is composed of the content ID: CM01.mp4, the frame number: 1-300, the gender: male, the age: 20-30, and the hobby: cars. The content ID uniquely identifies a content in which the corresponding CM scene is included, out of the plurality of contents stored in the virtual content output server 60. When the content is a CM, the content ID starts with the character string "CM." The pair of frame numbers is composed of two frame numbers showing how many frames in the entire content before the first frame and the last frame of the corresponding scene. The gender, the age, and the hobby are as described above.

The genre-list information 513 and the keyword-list information 514, are respectively, the lists of the genres and the keywords that are included in the program table 511 stored in the DB unit 501. Note that the data structures of the genre-list information 513 and the keyword-list information 514 are not illustrated.

(2) List Information Output Unit 503

The list information output unit 503 reads from the DB unit 501 the genre-list information 513 and the keyword-list information 514, and outputs the read genre-list information 513 and keyword-list information 514 to the Web server 30 via the LAN and the agent 40. The genre-list information 513 and the keyword-list information 514 are used to generate the genre-list screen 130 shown in FIG. 4 and the keyword-selection screen 150 shown in FIG. 5, respectively.

(3) Retrieval Information Receiving Unit 521

The retrieval information receiving unit 521 is composed of a LAN connection unit and possibly other components. The retrieval information receiving unit 521 receives the retrieval information from the DB server I/O unit 403, and outputs the received retrieval information to the retrieval unit 522.

(4) Retrieval Unit 522

The retrieval unit 522 is composed of a microprocessor, RAM, and possibly other components. The retrieval unit 522 receives the retrieval information from the retrieval information receiving unit 521, and searches the DB unit 501 based on the received retrieval information. Here, a specific example is given for an explanation purpose. Upon receipt of the retrieval information indicating the profile information: "Male/20-30/Cars", the genre: "Sports", and the keywords: "Professional Baseball/Major League Baseball", the retrieval unit 522 first reads the gender data of each piece of CM-scene information in the CM table 512 stored in the DB unit 501 to retrieve pieces of CM-scene information that indicate the gender "Male". Next, the retrieval unit 522 reads the age data of all the thus retrieved pieces of CM-scene information to retrieve pieces of CM-scene information that indicate the age "20-30" in addition to the gender "Male". Lastly, the retrieval unit 522 reads the hobby data of all the thus retrieved pieces of CM-scene information to finally retrieve pieces of CM-scene information that indicate the hobby "Cars" in addition to the gender "Male" and the age "20-30". In this manner, the retrieval unit 522 retrieves pieces of CM-scene information that comply with the received profile. The retrieval unit 522 then reads all the content IDs and the associated frame numbers from the finally retrieved pieces of CM-scene information, and outputs the read content IDs and frame IDs to the retrieved information output unit 523. Similarly, the retrieval unit 522 first reads the genre data of each piece of program-scene information in the program table 511 stored in the DB unit 501 to retrieve pieces of program-scene information that indicates the genre "Sports". Next, the retrieval unit 522 reads the keyword data of all the thus retrieved pieces of program-scene information to retrieve pieces of program-scene information that indicate the keyword "Professional Baseball" or "Major League Baseball". In this manner, the retrieval unit 522 retrieves pieces of program-scene information that comply with the user-selected genre and keyword(s). The retrieval unit 522 then reads all the content IDs and the associated frame numbers from the finally retrieved pieces of program-scene information, and outputs the read content IDs and frame numbers to the retrieved information output unit 523.

(5) Retrieved Information Output Unit 523

The retrieved information output unit 523 receives from the retrieval unit 522 the content IDs and the frame numbers, and outputs the received content IDs and frame numbers to the DB server I/O unit 403 via the LAN.

5. Virtual Content Output Server 60

Figure 11:
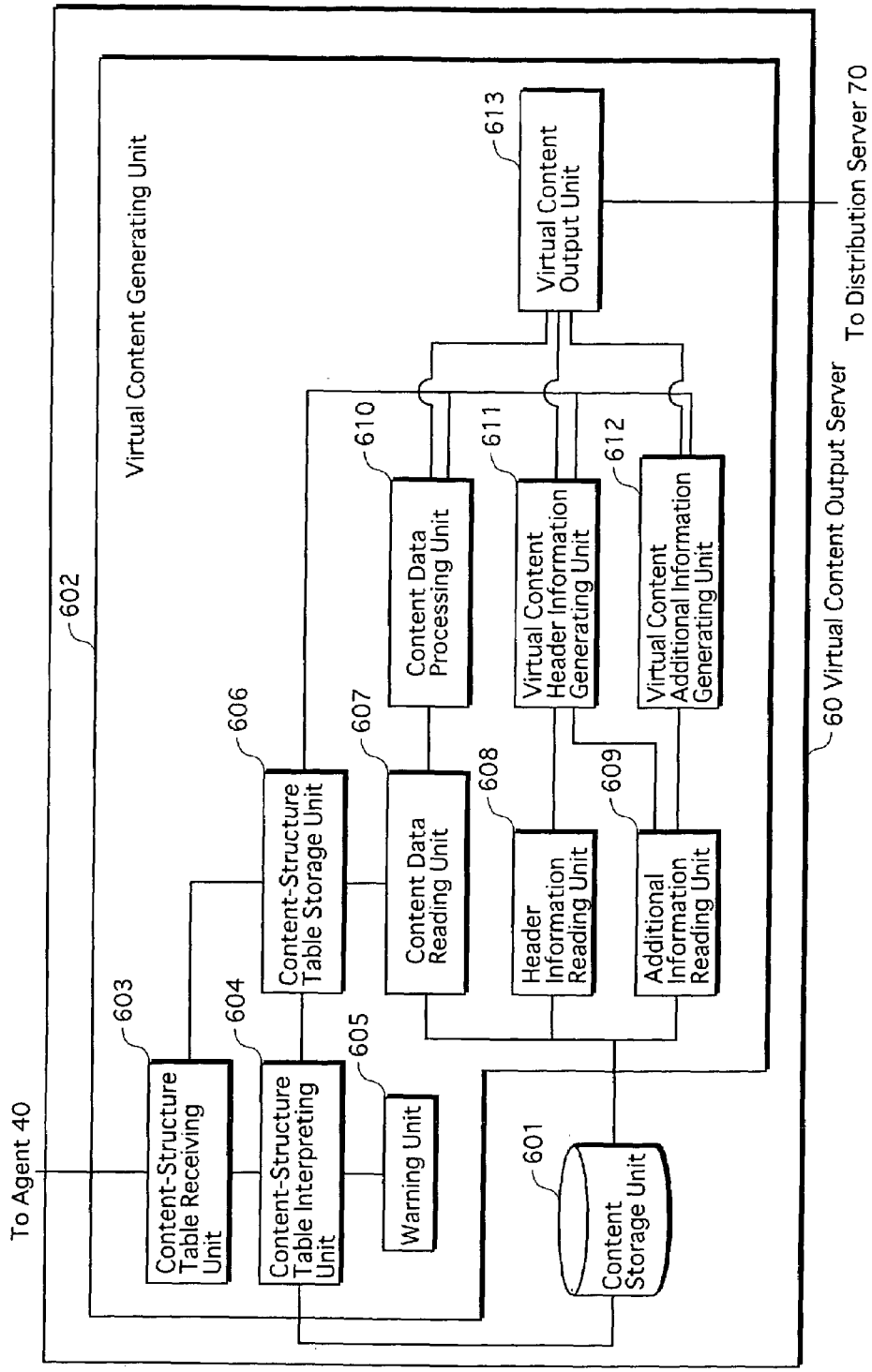
FIG. 11 is a view showing the structure of a virtual content output server 60.

Next, description is given to the virtual content output server 60. As shown in FIG. 11, the virtual content output server 60 is composed of a content storage unit 601 and a virtual content generating unit 602. The virtual content generating unit 602 is composed of a content-structure table receiving unit 603, a content-structure table interpreting unit 604, a warning unit 605, a content-structure table storage unit 606, a content data reading unit 607, a header information reading unit 608, an additional information reading unit 609, a content data processing unit 610, a virtual content header information generating unit 611, a virtual content additional information generating unit 612, and a virtual content output unit 613. The virtual content output server 60 is separately connected to the agent 40 and the distribution server 70 via the LAN. The virtual content output server 60 receives the content-structure table from the agent 40, generates a virtual content based on the received content-structure table, and outputs the generated virtual content to the distribution server 70.

Specifically, the virtual content output server 60 is a computer system composed of a microprocessor, ROM, RAM, a hard disk unit, a display unit, a LAN connection unit, a medium I/O unit, an internal bus, and possibly other components. The hard disk unit or the RAM used in the computer system stores various computer programs to generate a virtual content. The virtual content output server 60 performs its function by the microprocessor operating according to those programs.

Hereinafter, description is given to a specific example in which the virtual content output sever 60 receives, from the agent 40, the content-structure table 410 shown in FIG. 7, and generates a virtual content based on the content-structure table 410.

(1) Content Storage Unit 601

The content storage unit 601 is a hard disk unit, and stores contents. Each content is composed of a content ID, header information, content data, and additional information. Each content ID uniquely identifies a respective content. The header information includes the compressed format, the screen size, the number of frames, and the file size showing the compressed format of the content, the screen size of the content when decompressed, the number of frames constituting the content data, and the file size of the content data, respectively. The content data is digital data generated by encoding and compressing, in the above compressed format, a multimedia content in which video data and audio data are multiplexed. The additional information includes index information showing, for each frame constituting the content data, the byte location relative to the entire content and transmitting timing.

Figure 12:
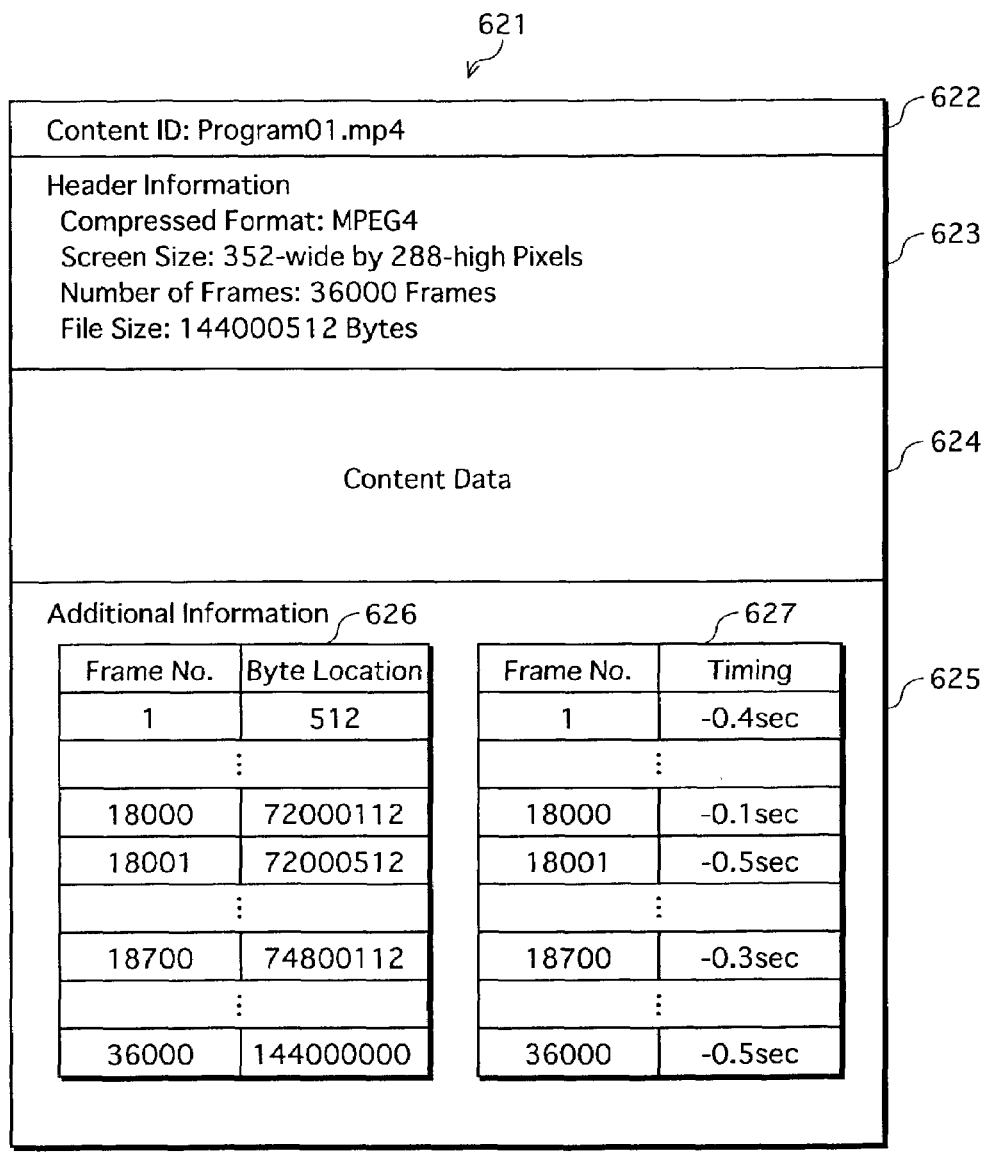
FIG. 12 is a view showing the data structure of a content 621 stored in the virtual content output server 60.
Figure 13:
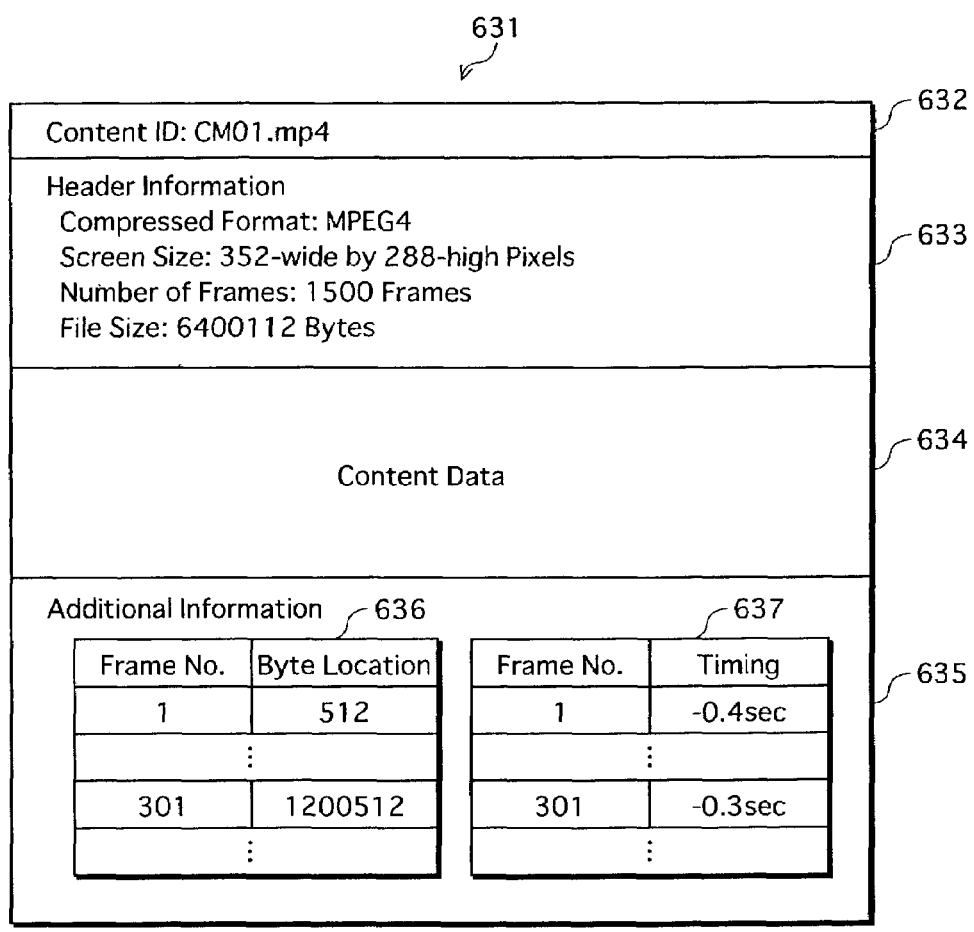
FIG. 13 is a view showing the data structure of a content 631 stored in the virtual content output server 60.

FIGS. 12 and 13 show specific examples of a content. A content 621 shown in FIG. 12 is composed of a content ID 622, header information 623, content data 624, and additional information 625. The content 621 is identified by its content ID "Program 01.mp4". The header information 623 shows that the content data 624 has been compressed in "MPEG (Moving Picture Experts Group) 4" format, and the screen size after decompression is "352-wide by 288-high pixels", the number of frames contained is "36000 frames", the file size is "144000512 bytes". The additional information 625 is composed of index information 626, and transmitting timing information 627. The index information 626 is composed of frame numbers in association with respective byte locations. Here, the frame numbers are serially assigned to each frame contained in the content data 624, and the byte locations are of respective frames in the entire content 621. The transmitting timing information 627 is information used to distribute the content data 624 in the streaming type technique, and is composed of the frame numbers and timing for transmitting respective frames.

(2) Content-Structure Table Receiving Unit 603

The content-structure table receiving unit 603 is composed of a LAN connection unit and possibly other components, and is connected to the agent 40 via the LAN. The content-structure table receiving unit 603 receives, from the agent 40, the content-structure table 410, and outputs the received content-structure table 410 to the content-structure table interpreting unit 604.

(3) Content-Structure Table Interpreting Unit 604

Specifically, the content-structure table interpreting unit 604 is composed of a microprocessor, RAM, and possibly other components. The content-structure table interpreting unit 604 receives the content-structure table 410 from the content-structure table receiving unit 603, and writes the received content-structure table 410 to the content-structure table storage unit 606. In addition, the content-structure table interpreting unit 604 judges in the following manner whether the pieces of content data contained in the content-structure table 410 are of an appropriate combination, i.e., whether the pieces of content data contained in the content-structure table are of the same compressed format. When judging that the combination is inappropriate, the content-structure table interpreting unit 604 generates a warning signal and outputs the generated warning signal to the warning unit 605.

The content-structure table interpreting unit 604 reads the content IDs "Program01.mp4", "CM09.mp4", "CM03.mp4", "Program05.mp4", and "CM09.mp4" from the content-structure table 410 that is stored in the content-structure table storage unit 606. Next, the content-structure table interpreting unit 604 retrieves from the storage unit 601, each content having the same content ID as any of the five read content IDs, then obtains respective header information from each of the five retrieved contents. Next, the content-structure table interpreting unit 604 reads from the content-structure table 410 the start-frame number and end-frame number corresponding to a content ID to judge whether the read frame numbers fall within the frame numbers shown in the header information of the respective content. Next, the content-structure table interpreting unit 604 reads a compressed format from each piece of header information, and judges whether all of the read compressed formats are the same.

(4) Content-Structure Table Storage Unit 606

The content-structure table storage unit 606 is composed of a hard disk unit, and possibly other components, and stores the content-structure table 410 received from the content-structure table receiving unit 603.

(5) Content Data Reading Unit 607

The content data reading unit 607 reads the content-structure table 410 stored in the content-structure table storage unit 606, and reads frames of the content data stored in the content storage unit 601 in accordance with the content-structure table 410.

The content data reading unit 607 reads, from the content 621, that is stored in the content storage unit 601 and that is identified by the content ID "Program 01.mp4", frames numbered from 1 to 18000 out of the frames constituting the content data 624, and then outputs the read frames to the content data processing unit 610. Next, the content data reading unit 607 reads, from the content 631 that is stored in the content storage unit 601 and that is identified by the content ID "CM01.mp4", frames numbered 1 to 300 out of the frames constituting the content data 634, and then outputs the read frames to the content data processing unit 610. Next, the content data reading unit 607 reads, from the content 621 that is stored in the content storage unit 601 and that is identified by the content ID "Program01.mp4", frames numbered 18001 to 36000 out of the frames constituting the content data 624, and then outputs the read frames to the content data processing unit 610. In the similar manner, the content data reading unit 607 sequentially reads frames numbered 501 to 750 from the content identified by the content ID "CM03.mp4", reads frames numbered 1201 to 25800 from the content identified by the content ID "Program05.mp4", reads frames numbered 901 to 1400 from the content identified by the content ID "CM09" mp4". The content data reading unit 607 outputs the read frames to the content data processing unit 610.

(6) Header Information Reading Unit 608

The header information reading unit 608 reads the content-structure table 410 that is stored in the content-structure table storage unit 606, and reads header information from the content storage unit 601 in accordance with the content IDs contained in the content-structure table 410.

The header information reading unit 608 reads, from the content-structure table storage unit 606, all the content IDs contained in the content-structure table 410. In addition, the header information reading unit 608 reads, from the content storage unit 601, a piece of header information of a respective content identified by each of the read content IDs, and outputs all the pieces of read header information to the virtual content header information generating unit 611.

(7) Additional information Reading Unit 609

The additional information reading unit 609 reads, from the content-structure table storage unit 606, all the content IDs contained in the content-structure table 410. In addition, the additional information reading unit 609 reads, from the content storage unit 601, additional information of a respective content identified by each of the read content IDs. The additional information reading unit 609 then outputs index information included in the read additional information to the virtual content header information generating unit 611 as well as to the virtual content additional information generating unit 612. The additional information reading unit 609 also transmits the transmitting timing information included in the read additional information to the virtual content additional information generating unit 612.

(8) Content Data Processing Unit 610

The content data processing unit 610 receives, from the content data reading unit 607, the frames numbered 1 to 18000 of the content identified by the content ID "Program 01.mp4", and conducts processing, such as renumbering of the frame numbers so that the received frames have a serial number in the virtual content, and rewriting of the Time Stamp (playback time) of each received frame. The content data processing unit 610 then outputs the processed frames as above to the virtual content output unit 613.

Further, the content data processing unit 610 receives, from the content data reading unit 607, the frames numbered 1 to 300 of the content identified by the content ID "CM01.mp4", and conducts similar processing, such as renumbering of the frame numbers, and rewriting of the Time Stamp (playback time) of each received frame. The content data processing unit 610 then outputs the processed frames as above to the virtual content output unit 613.

In the similar manner, the content data processing unit 610 conducts similar processing, such as renumbering of the frame numbers or rewriting of the Time Stamp (playback time), on all the frames received from the content data reading unit 607, and outputs the processed frames to the virtual content output unit 613.

(9) Virtual Content Header Information Generating Unit 611

Specifically, the virtual content header information generating unit 611 is composed of a microprocessor, ROM, RAM, and possibly other components. The ROM stores a program for generating a virtual content header. The virtual content header information generating unit 611 performs its function by the microprocessor executing the program.

The virtual content header information generating unit 611 receives a plurality of pieces of header information from the header information reading unit 608, and a plurality of pieces of index information from the additional information reading unit 609, and reads the content-structure table 410 from the content-structure table storage unit 606. Based on the received information and the read table, the virtual content header information generating unit 611 generates, in the following manner, virtual content header information showing the compressed format, the screen size, the number of frames, and the file size.

First, the virtual content header information generating unit 611 reads, from each piece of header information, the compressed format "MPEG4" and the screen size "352-wide by 288-high pixels", and writes the read information as it is in a predetermined memory area because these two items of information remain the same in the original content and in the virtual content to be generated.

Next, the virtual content header information generating unit 611 calculates the number of frames contained and the file size, which differ between the original content and the virtual content to be generated, using the content-structure table 410, the plurality of pieces of header information, and the plurality of pieces of index information, and writes the calculated number of frames and file size in predetermined memory areas. The calculations are described in detail below.

Calculation of Number of Frames Contained in Virtual Content

The number of frames contained in the virtual content is calculated using the content-structure table 410. With reference to the respective start-frame numbers and the end-frame numbers, the program scene corresponding to the playback number "1" in the content-structure table 410 is composed of 18000 frames, the CM scene corresponding to the playback number "2" is composed of 300 frames, the program scene corresponding to the playback number "3" is composed of 18000 frames, the CM scene corresponding to the playback number "4" is composed of 250 frames, the program scene corresponding to the playback number "5" is composed of 24600, and the CM scene corresponding to the playback number "6" is composed of 500 frames. By summing those numbers of frames contained in each scene, the total number of frames contained in the virtual content is calculated to be 61750 frames.

Calculation of File Size of Virtual Content

The file size of the virtual content is calculated using the plurality of pieces of index information and the plurality of pieces of header information.

The virtual content header information generating unit 611 first obtains the file size of the program scene corresponding in the content-structure table 410 to the playback number "1". To this end, the virtual content header information generating unit 611 refers to the index information 626 to obtain the byte location "512" that is of the starting frame and the byte location "72000612" that is of a frame following the end-frame. The virtual content header information generating unit 611 then subtracts the byte location "512" of the start-frame from the byte location "72000512" of the frame following the end-frame, so that the file size of the subject program scene is calculated to be 72000000 bytes.

Next, the virtual content header information generating unit 611 obtains the file size of the CM scene corresponding in the content-structure table 410 to the playback number "2". To this end, the virtual content header information generating unit 611 refers to the index information 636 to obtain the byte location "312" that is of the start-frame and the byte location "1200512" of a frame following the end-frame. The virtual content header information generating unit 611 then subtracts the byte location "512" of the start-frame from the byte location "1200512" of the frame following the end-frame, so that the file size of the subject CM scene is calculated to be 1200000 bytes.

Further, the virtual content header information generating unit 611 obtains the file size of the program scene corresponding in the content-structure table 410 to the playback number "3". To this end, the virtual content header information generating unit 611 refers to the index information 626 to obtain the byte location "72000512" that is of the start-frame and the byte location "144000512" that is of a frame following the end-frame. The virtual content header information generating unit 611 then subtracts the byte location "72000512" of the start-frame from the byte location "144000512" of the frame following the end-frame, so that the file size of the subject program scene is calculated to be 72000000.

Similarly, the virtual content header information generating unit 611 obtains the respective file sizes of the program scenes corresponding to the playback numbers "4", "5" and "6".

Figure 14:
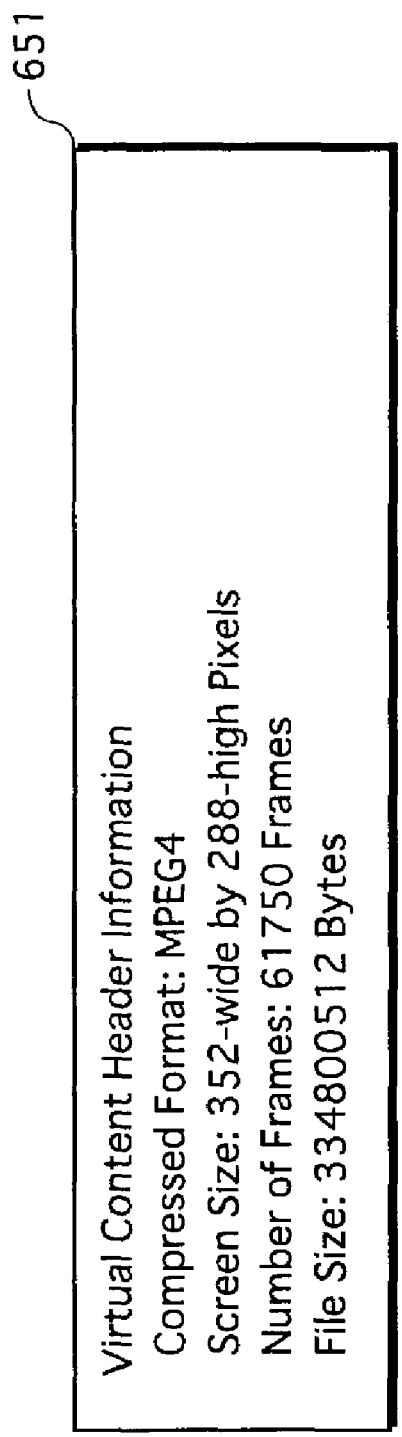
FIG. 14 is a view showing virtual content header information 751 generated by the virtual content output server 60.

By summing the calculated file sizes of the scenes corresponding to the playback numbers "1" to "6", and adding to the calculated sum the file size of the virtual content header information, the file size of the entire virtual content is obtained. Here, the file size of the virtual content is 334800512 bytes. FIG. 14 shows the data structure of the virtual content header information 651 generated as above.

(10) Virtual Content Additional Information Generating Unit 612

Specifically, the virtual content additional information generating unit 612 is composed of a microprocessor, ROM, RAM, and possibly other components. The ROM stores a program for generating virtual content additional information. The virtual content additional information generating unit 612 performs its function by the microprocessor executing to the program.

Figure 16:
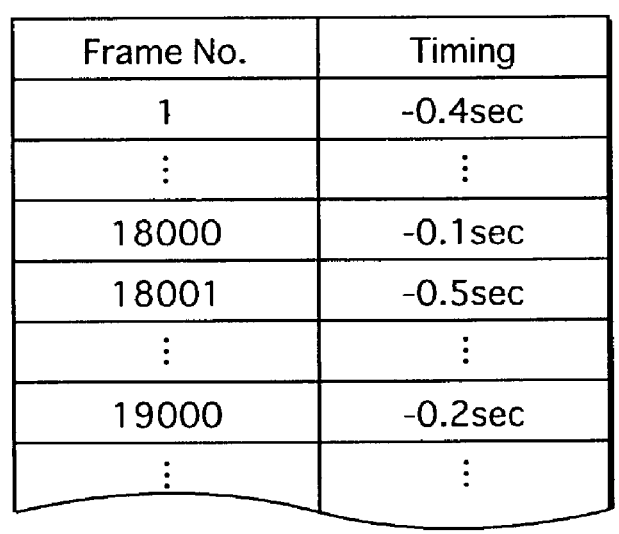
FIG. 16 is view showing the data structure of virtual content transmitting timing information 671 generated by the virtual content output server 60.

The virtual content additional information generating unit 612 receives the plurality of pieces of additional information from the additional information reading unit 609, and reads the content-structure table 410 from the content-structure table storage unit 606. Based on the received additional information and the read content-structure table 411, the virtual content additional information generating unit 612 calculates frame numbers, byte locations, transmitting timing of each frame constituting the virtual content. Next, the virtual content additional information generating unit 612 establishes an association between the calculated frame numbers and locations, thereby generating virtual content index information 661 as shown in FIG. 15. Further, the virtual content additional information generating unit 612 establishes association between the calculated frame numbers and transmitting timing, thereby generating virtual content transmitting timing information 671 as shown in FIG. 16.

Note that detailed description will be given later to the calculations performed to obtain the frame numbers, the byte locations, and the transmitting timing of each frame constituting the virtual content.

(11) Virtual Content Output Unit 613

Specifically, the virtual content output unit 613 is composed of a LAN connection unit and possibly other components, and is connected to the distribution server 70 via the LAN.

The virtual content output server 613 receives the plurality of frames from the content data reading unit 607, the virtual content header information from the virtual content header information generating unit 611, and the virtual content index information as well as the virtual content transmitting timing information both from the virtual content additional information generating unit 612. In addition, the virtual content output unit 613 establishes an association among the received plurality of frames, virtual content header information, virtual content index information and virtual content transmitting timing information, thereby to outputs the virtual content, i.e., the content file which virtually exists.

6. Distribution Server 70

Now, description is given to the distribution server 70.

Specifically, the distribution server 70 is a computer system composed of a microprocessor, ROM, RAM, a hard disk unit, a LAN connection unit, and possibly other components. The distribution server 70 is separately connected to the clients 10 and 11 via the Internet 20, and to the virtual content output server 60 via the LAN. Note that the construction of the distribution server 70 is not illustrated.

The distribution server 70 receives, from the virtual content output server 60, the virtual content that is the mutually associated plurality of frames, virtual content header information, virtual content index information, and virtual content transmitting timing information. The distribution server 70 transmits the received virtual content to the client 10 via the Internet 20 after appending transmission destination that is information specifying the client 10.

<Operations>

1. Overall Operations

First, description is given to operations performed by the virtual content distribution system 1.

Figure 17:
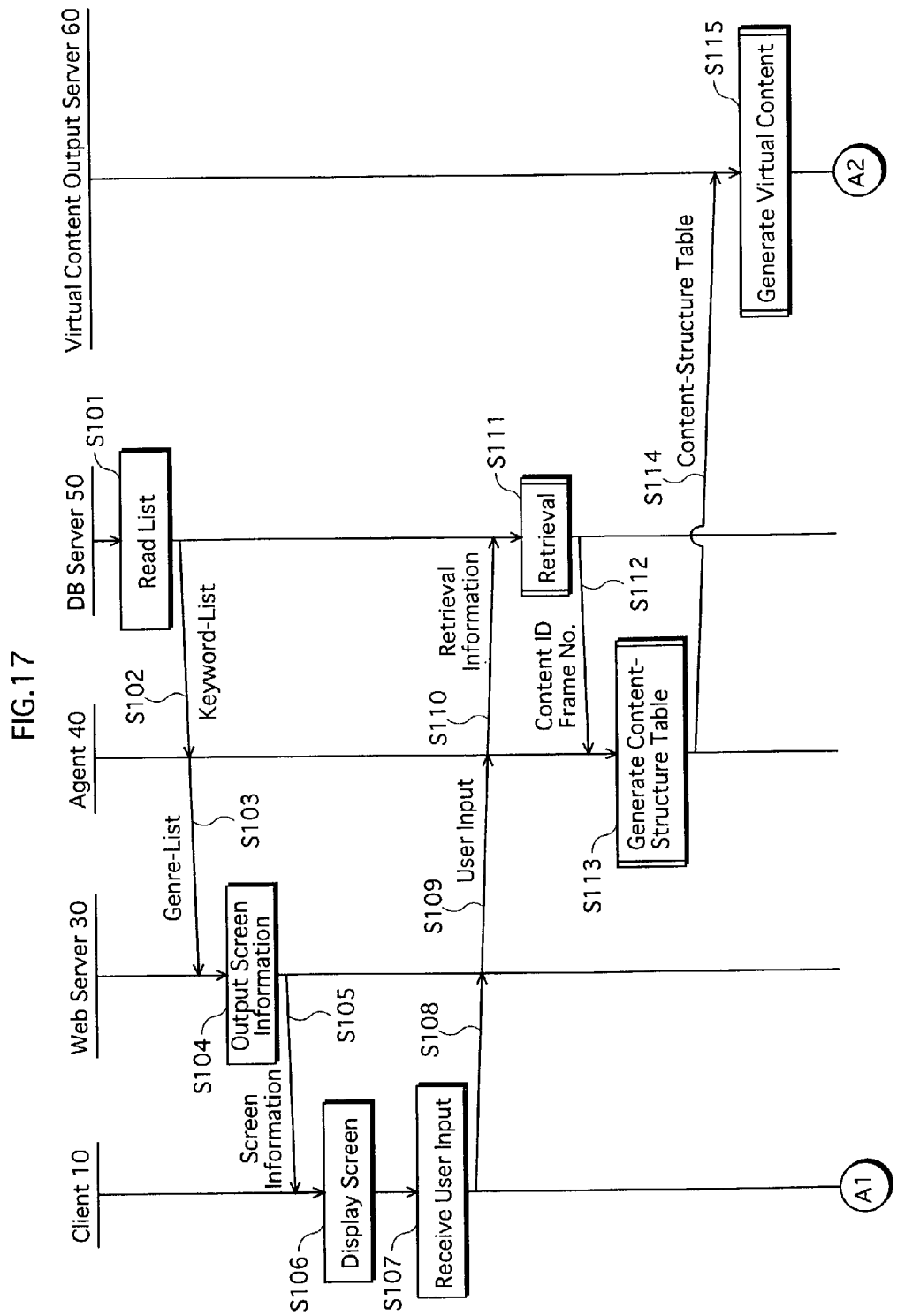
FIG. 17 is a flowchart showing overall operations performed by the virtual content distribution system 1, and continued to FIG. 18.
Figure 18:
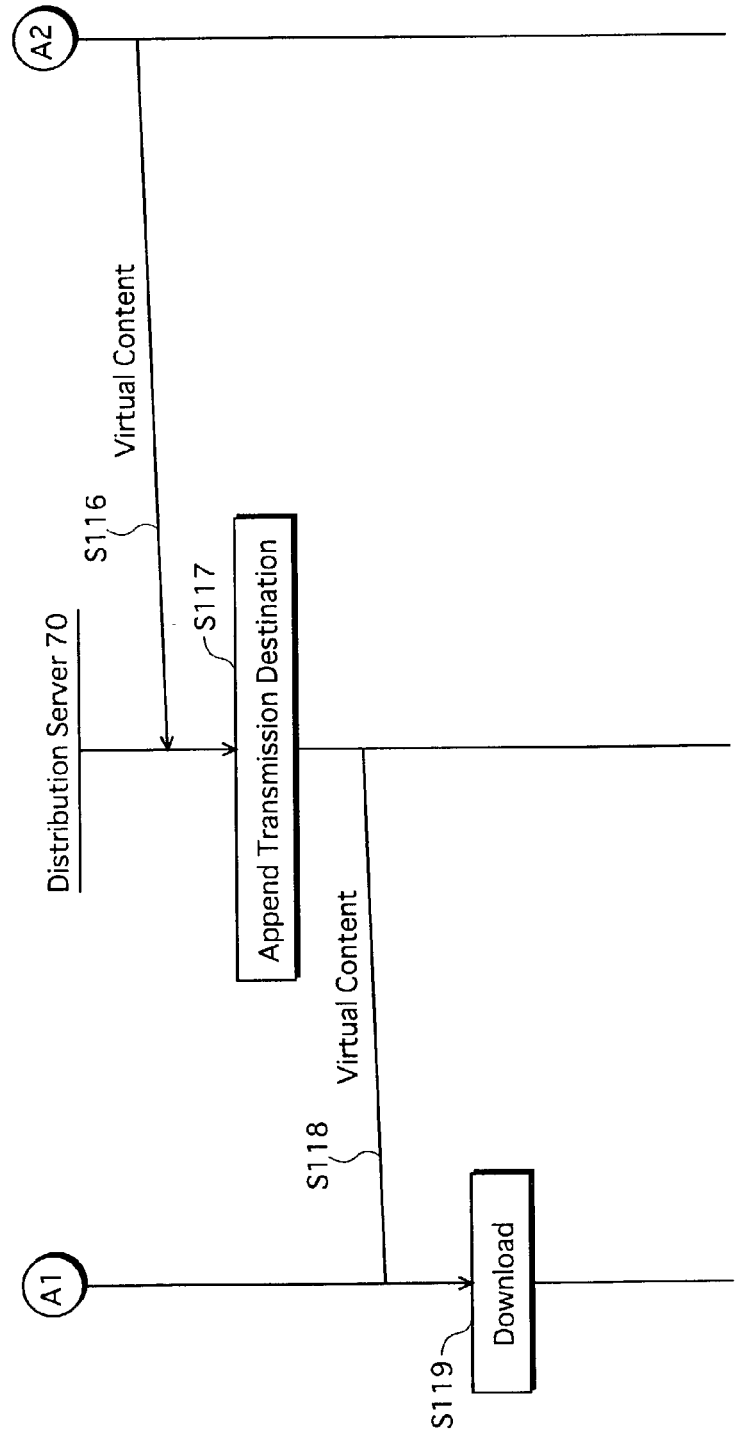
FIG. 18 is the flowchart showing the overall operations performed by the virtual content distribution system 1, and continued from FIG. 17.
Figure 19:
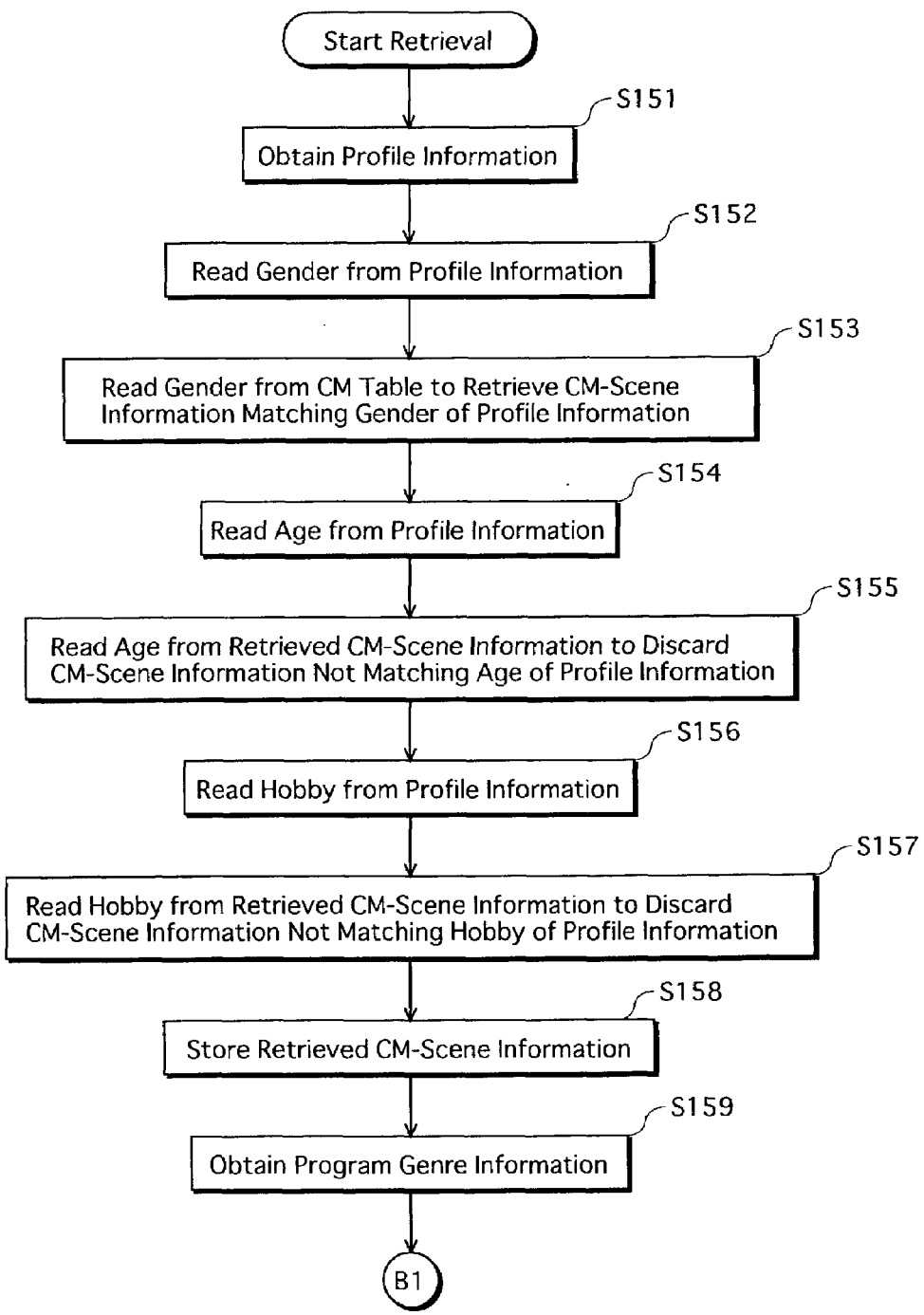
FIG. 19 is a flowchart showing retrieval operations performed by the DB server 50 and continued to FIG. 20.
Figure 20:
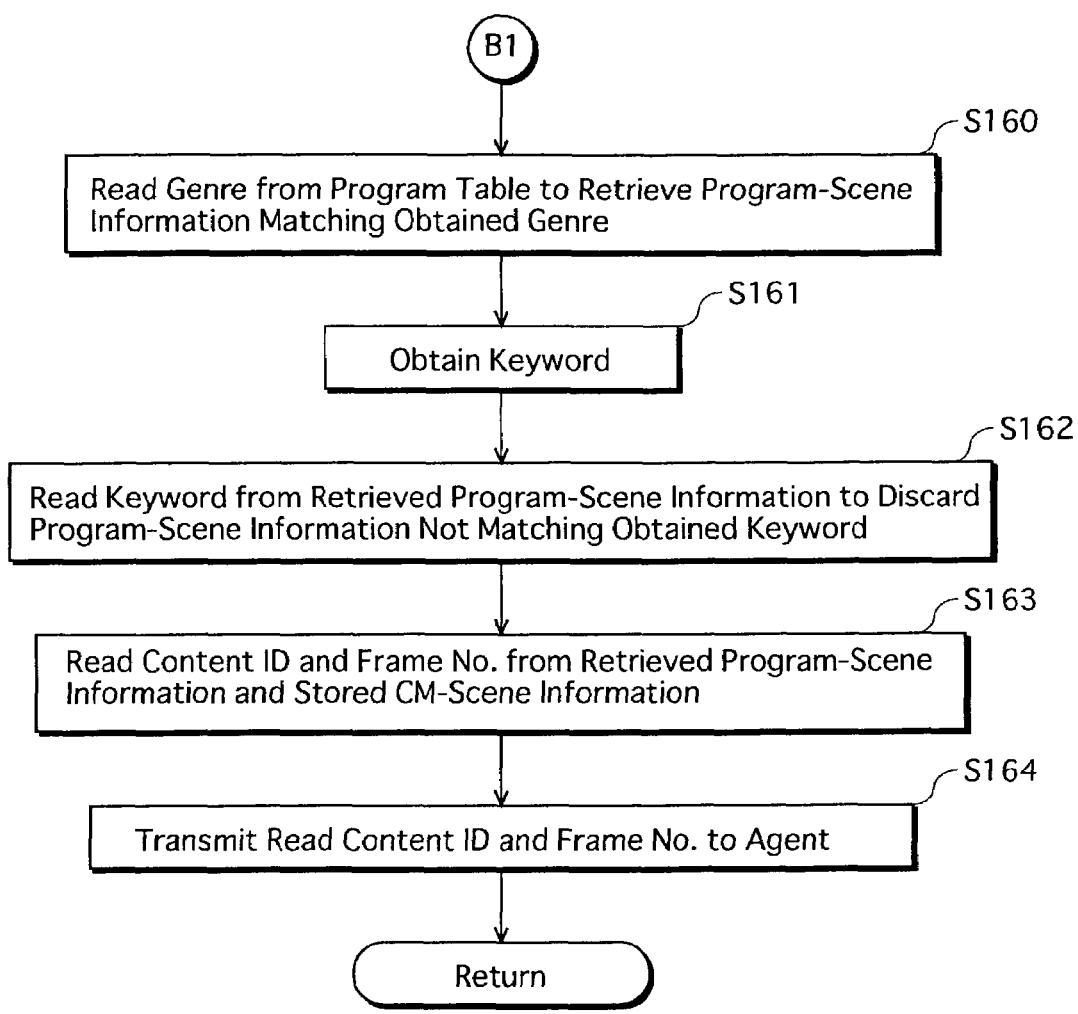
FIG. 20 is the flowchart showing the retrieval operations performed by the DB server 50 and continued from FIG. 19.

FIGS. 17 and 18 show a flowchart of the overall operations performed by the virtual content distribution system 1.

The list information output unit 503 of the DB server 50 reads from the DB unit 501 the genre-list information unit 513 and the keyword-list information 514 (step S101). The list information output unit 503 transmits the read genre-list information 513 and keyword-list information 514 to the agent 40 via the LAN, whereby the agent 40 receives the genre-list information 513 and the keyword-list information 514 (step S102). The agent 40 then transmits the received genre-list information 513 and keyword-list information 514 to the Web sever 30 via the LAN, whereby the Web server 30 receives the genre-list information 513 and the keyword-list information 514 (step S103).

The Web server 30 converts the received genre-list information 513 and keyword-list information 514 into the HTML format so as to generate and output screen control information (step S104). The Web server 30 transmits the generated screen control information to the client 10 via the Internet 20, and the client 10 receives the screen control information (step S105).

The control unit 102 of the client 10 generates a screen based on the received screen control information, and outputs the generated screen to the display unit 103 where the screen is displayed (step S106). Upon receipt of input made by user operations (step S107), the input unit 104 transmits the received input to the Web server I/O unit 401 of the agent 40 via the transmission/reception unit 101, the Internet 20, and the Web server 30 (steps S108, and S109). The Web server I/O unit 401 then outputs the received input to the information control unit 402, and the information control unit 402 generates retrieval information based on the received input. The DB server I/O unit 403 transmits the retrieval information to the DB server 50 via the LAN, so that the DB server 50 receives the retrieval information (step S110).

Next, the query unit 502 of the DB server 50 searches the DB unit 501 based on the received retrieve information (step S111) to retrieve content IDs and corresponding frame numbers. The query unit 502 transmits the retrieved content IDs and frame numbers to the agent 40 via the LAN, and the agent 40 receives the transmitted content IDs and frame numbers (step S112). The content-structure table generating unit 414 of the agent 40 generates a content-structure table using the received content IDs and frame numbers (step S113). The content-structure table generating unit 414 transmits the generated content-structure table to the content-structure table receiving unit 603 of the virtual content output server 60 via the content-structure table output unit 405 and the LAN, so that the content-structure table receiving unit 603 receives the content-structure table (step S114).

The virtual content generating unit 602 generates a virtual content, i.e., a content file which virtually exists, using the contents stored in the content storage unit 601 based on the received content-structure table (step S115). The virtual content output unit 613 of the virtual content generating unit 602 transmits the generated virtual content to the distribution server 70 via the LAN, and so that the distribution server 70 receives the virtual content (step S116). The virtual content distribution server 70 appends to the received virtual content, transmission destination showing the destination to which the virtual content is to be transmitted (step S117). The virtual content distribution server 70 then transmits the virtual content to the client 10 via the Internet 20, so that the client 10 receives the virtual content (step S118).

The client 10 downloads the virtual content (step S119).

2. Retrieval Operations

Now, description is given to retrieval operations performed by the DB server 50. Note that the operations described herein are the details of the step S111 of the flowchart shown in FIG. 17.

The retrieval information receiving unit 521 of the query unit 502 obtains profile information from the received retrieval information (step S151), and outputs the profile information to the retrieval unit 522. The retrieval unit 522 reads the gender information from the profile information (step S152). The retrieval unit 522 then reads gender information from each piece of CM-scene information contained in the CM table 512 stored in the DB unit 501 to extract pieces of CM-scene information that have the gender information matching the gender information read from the profile information (step S153). Next, the retrieval unit 522 reads the age information from the profile information (step S154) as well as from each of the pieces of CM-scene information extracted as above. The retrieval unit 522 then further extracts, from among the above extracted pieces of CM-scene information, pieces of CM-scene information that have the age information matching the age information read from the profile information, and discards non-extracted pieces of CM-scene information (step S155). Next, the retrieval unit 522 reads hobby information from the profile information (step S156) as well as from each piece of the further extracted CM-scene information. The retrieval unit then finally extracts, from among the further extracted pieces of CM-scene information, pieces of CM-scene information that has the hobby information matching the hobby information read from the profile information, and discards the non-extracted pieces of CM-scene information (step S157). The retrieval unit 522 stores the CM-scene information that results from the above selection (step S158).

Next, the retrieval information receiving unit 521 of the query unit 502 obtains genre information from the received retrieval information (step S159), and outputs the genre information to the retrieval unit 522. The retrieval unit 522 reads genre information from each piece of program-scene information that is contained in the program table 511 stored in the DB unit 501 to extract pieces of program-scene information that match the read genre information (step S160). Next, the retrieval information receiving unit 521 obtains keyword information from the received retrieval information (step S61), and outputs the obtained keyword information to the retrieval unit 522. The retrieval unit 522 reads keyword information from each piece of the extracted program-scene information in order to further extract pieces of program-scene information having matching keyword information, and discards non-extracted program-scene information (step S162).

The retrieval unit 522 reads a content ID and a pair of frame numbers from each piece of the stored CM-scene information. Further, the retrieval unit 522 reads a content ID and a pair of frame numbers from each piece of the extracted program-scene information (step S163). The retrieval unit 522 then outputs, to the retrieved information output unit 523, all the read content IDs in association with the respective pairs of frame numbers. The retrieved information output unit 523 receives the content IDs together with the respective pairs of frame numbers, and outputs the received content IDs together with the respective pairs of frame numbers to the agent 40 via the LAN (step S164).

3. Content-Structure Table Generating Operations

Figure 21:
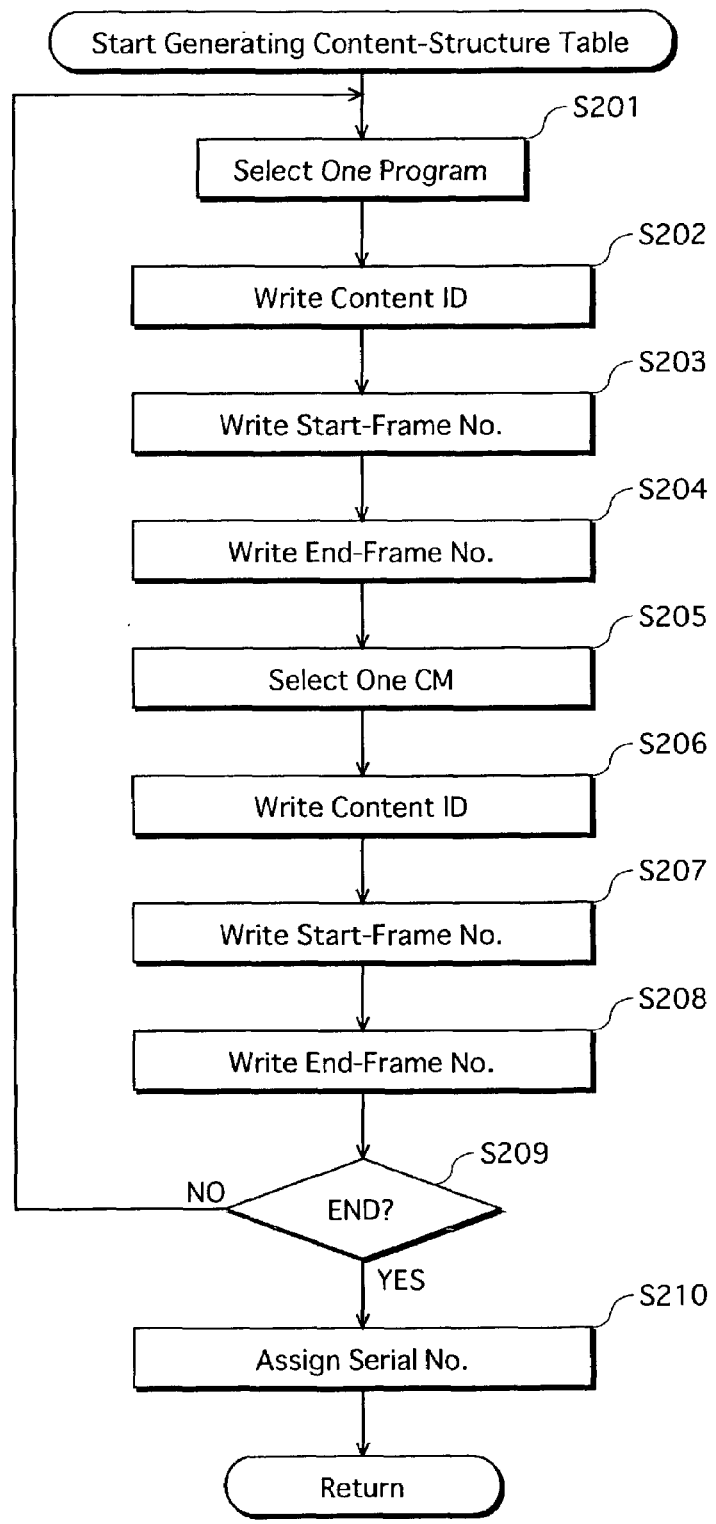
FIG. 21 is a flowchart showing operations performed by the agent 40 for generating a content-structure table.

Next, description is given to operations performed by the agent 40 for generating a content-structure table with reference to FIG. 21. Note that operations described herein are details of the step S113 in the flowchart shown in FIG. 17.

The DB server I/O unit 403 of the agent 40 outputs to the content-structure table generating unit 404 via the information control unit 402, the content IDs and the respective pairs of frame numbers that are received from the DB server 50.

The content-structure table generating unit 404 receives the plurality of content IDs together with the respective pairs of frame numbers, and selects one content ID that starts with "Program" as well as the pair of frame numbers corresponding to the selected content ID (step S201). The content-structure table generating unit 404 then writes the selected content ID (step S202), as well as a start-frame number (step S203) and an end-frame number (step S204) that constitute the pair of frame numbers corresponding to the selected content ID.

Next, the content-structure table generating unit 404 selects one content ID that starts with "CM" as well as the pair of frame numbers corresponding to the selected content ID (step S205). The content-structure table generating unit 404 then writes the selected content ID (step S206), as well as a start-frame number (step S207) and an end-frame number (step S208) that constitute the pair of frame number corresponding to the selected content ID. The content-structure table generating unit 404 judges whether all the content IDs and the respective pairs of frame numbers have been written. If the judgment results in YES (step S209, YES), the content-structure table generating unit 404 assigns a serial number as a playback number to each content ID in the written order (step S210). On the other hand, if the judgment results in NO (step S209, NO), the content-structure table generating unit 404 goes back to the step S201, and repeats the above operations.

4. Virtual Content Generating Operations

Figure 22:
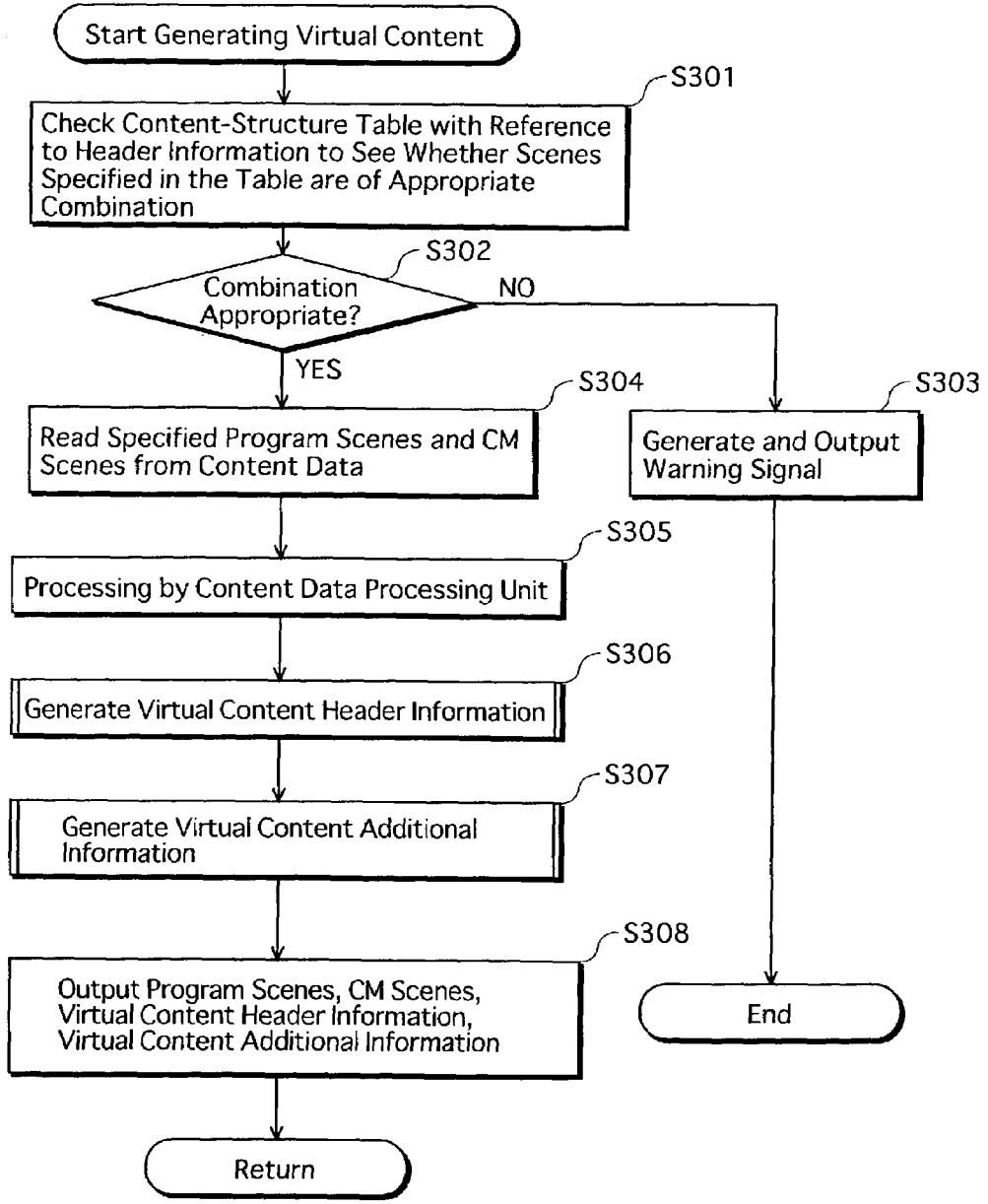
FIG. 22 is a flowchart showing overall operations performed by the virtual content output server 60 for generating a virtual content.

Now, description is given with reference to FIG. 22 to operations performed by the virtual content output server 60 for generating a virtual content. Note that operations described herein are details of the step S115 in the flowchart shown in FIG. 17.

The content-structure table receiving unit 603 of the virtual content output server 60 outputs the received content-structure table to the content-structure table interpreting unit 604. The content-structure table interpreting unit 604 writes the received content-structure table to the content-structure table storage unit 606 where the received content-structure table is stored.

The content-structure table interpreting unit 604 reads, from the content storage unit 601, header information of all the contents corresponding to the content IDs contained in the content-structure table that is stored in the content-structure table storage unit 606. The content-structure table interpreting unit 604 then judges whether the content-structure table contains an appropriate combination of scene information, i.e., whether all the respective pieces of read header information show the same compressed format and the same screen sizes (step S301). When the combination is inappropriate (step S302, NO), the content-structure table interpreting unit 604 generates a warning signal, and outputs the generated warning signal to the warning unit 605 (step S303). On the other hand, when the combination is appropriate (step S302, YES), the content data reading unit 607 reads, from the content data stored in the content storage unit 601, program scenes and CM scenes that are designated in the content-structure table (step S304).

Next, the content data processing unit 610 conducts processing on each frame constituting the read program scenes and CM scenes (step S305), the virtual content header information generating unit 611 generates virtual content header information (step S306), and the virtual content additional information generating unit 612 generates virtual content additional information (step S307).

The virtual content output unit 613 outputs, to the distribution server 70 via the LAN, the program scenes and the CM scenes that are processed by the content data processing unit 610, the virtual content header information generated by the virtual content header information generating unit 611, and the virtual content additional information generated by the virtual content additional information generating unit 612 (step S308).

(1) Virtual Content Header Information Generating Operations

Figure 23:
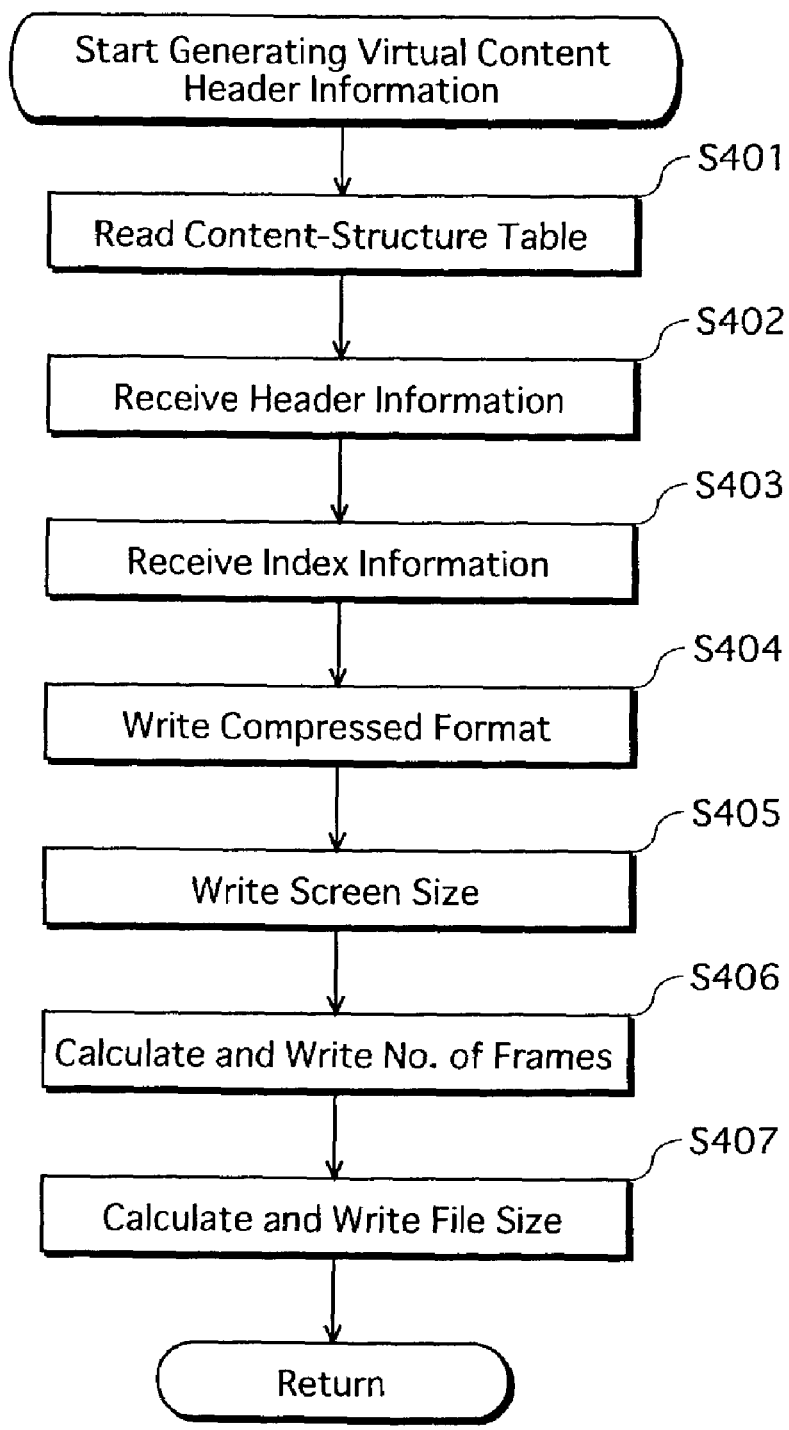
FIG. 23 is a flowchart showing operations performed by the virtual content output server 60 for generating virtual content header information.

Now, a description is given relating to operations for generating virtual content header information with reference to the flowchart shown in FIG. 23. Note that operations described herein are the details of step S305 shown in the flowchart in FIG. 22.

The virtual content header information generating unit 611 reads the content-structure table from the content-structure table storage unit 606 (step S401). In addition, the virtual content header information generating unit 611 receives the header information from the header information reading unit 608 (step S402), as well as the index information from the additional information reading unit 609 (step S403).

The virtual content header information generating unit 611 writes the compressed format (step S404) and the screen size information (step S405) both shown in the obtained header information. Next, the virtual content header information generating unit 611 calculates the number of frames constituting the virtual content using the obtained header information and index information, and writes the calculated number of frames (step S406). Then, the virtual content header information generating unit 611 calculates the file size of the virtual content using the obtained content-structure table, header information, and index information (step S407).

(2) Virtual Content Additional Information Generating Operations

Figure 24:
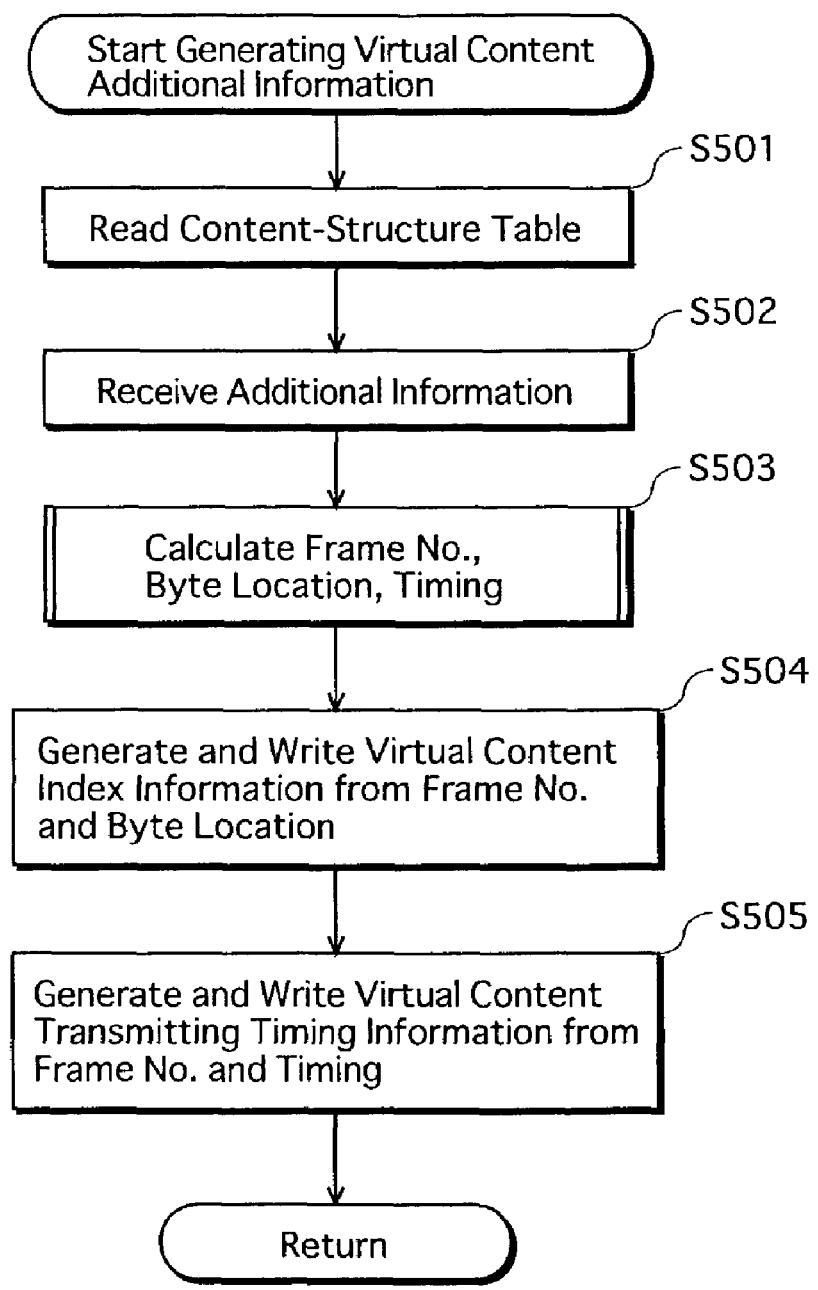
FIG. 24 is a flowchart showing operations performed by the virtual content output server 60 for generating virtual content additional information.

Now, a description is given relating to operations for generating virtual content additional information with reference to the flowchart shown in FIG. 24. Note that operations described herein are the details of step S306 shown in the flowchart in FIG. 22.

The virtual content additional information generating unit 612 reads the content-structure table from the content-structure table storage unit 606 (step S501), and receives the additional information from the additional information reading unit 609 (step S502). Next, the virtual content additional information generating unit 612 calculates the frame number, the byte location, and timing of each frame constituting the virtual content (step S503). The virtual content additional information generating unit 612 then generates index information by establishing an association between the calculated frame number and byte location, and writes the generated index information (step S504). In addition, the virtual content additional information generating unit 612 generates virtual content transmitting timing information by establishing an association between the calculated frame number and transmitting timing, and writes the generated virtual content transmitting timing information (step S505).

(3) Calculation of Frame Number, Byte Location, and Timing

Figure 25:
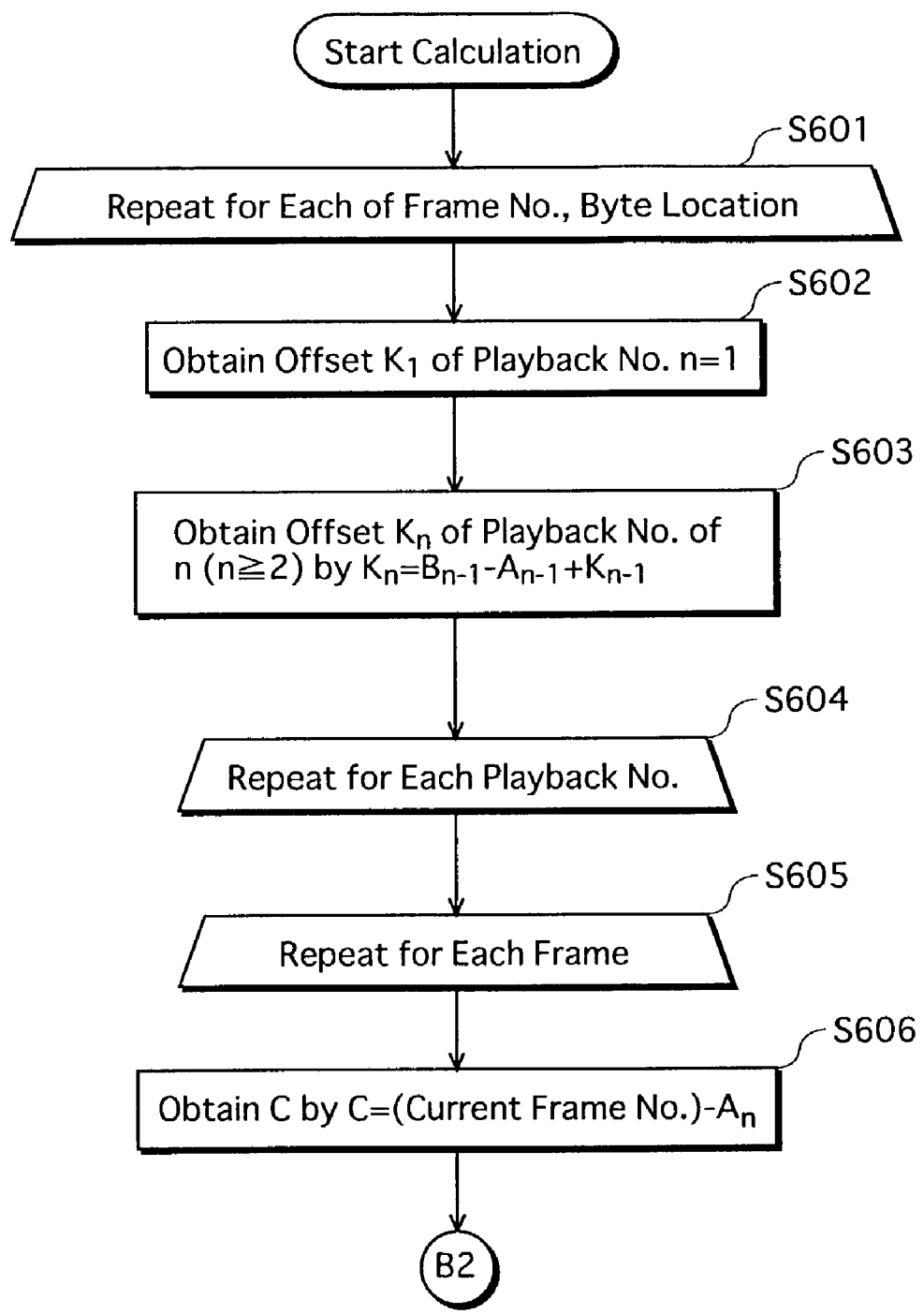
FIG. 25 is a flowchart showing operations performed by the virtual content output server 60 for calculating the frame number, the byte location, and the timing of each frame, and continued to FIG. 26.
Figure 26:
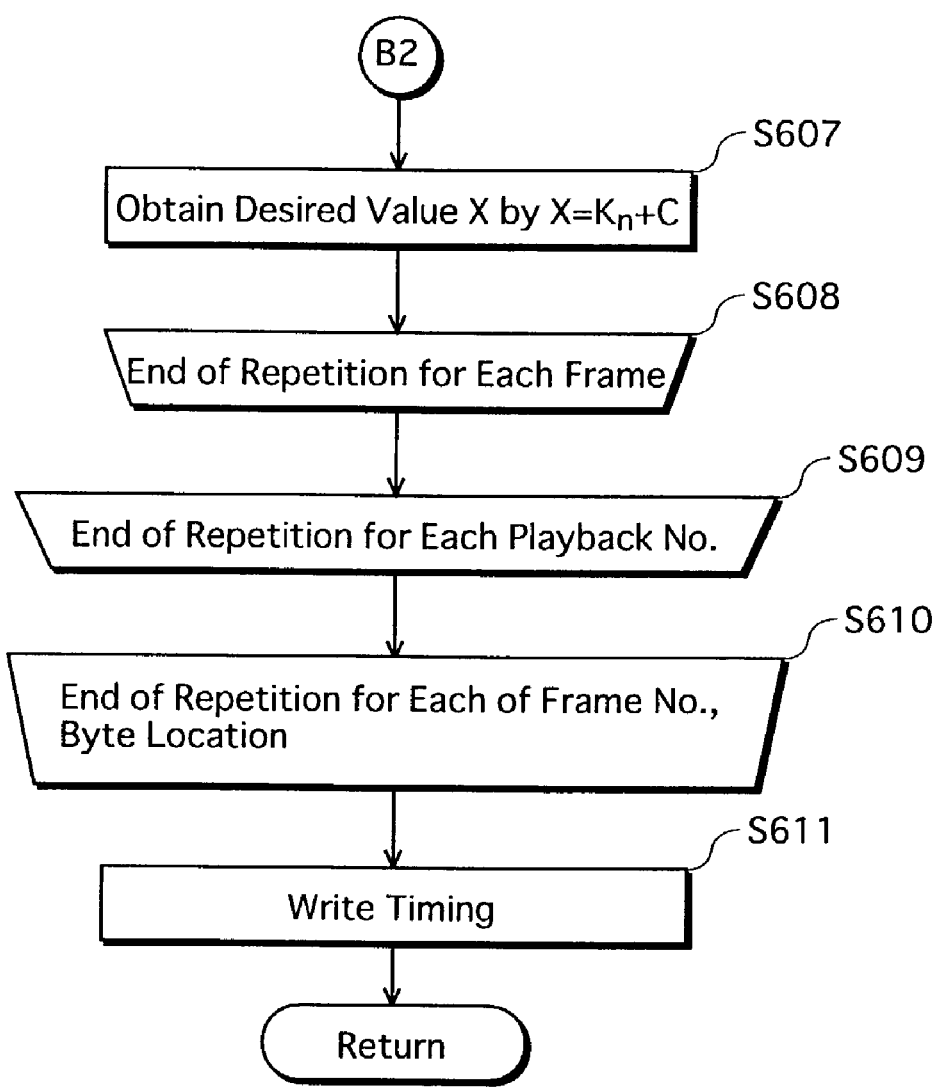
FIG. 26 is the flowchart showing the operations performed by the virtual content output server 60 for calculating the frame number, the byte location, and the timing of each frame, and continued from FIG. 25.

Hereinafter, a description is given, with reference to the flowchart shown in FIGS. 25 and 26, relating to operations for calculating the frame number, the byte location, and the timing of each frame constituting the virtual content. Note that operations described herein are the details of step S503 shown in the flowchart in FIG. 24.

Note that steps S601-S610 described below are repeated for each calculation of frame number, and byte location.

First, let the playback number n=1, and the start-frame of the scene-information that is assigned the playback number n=1 in the content-structure table 410 is subjected for calculation. With reference to the index information 626, a frame number or a byte location of a frame corresponding to the subjected frame is obtained, and the obtained value is denoted by $K_1$ (step S602). In the specific example, when the playback number n=1, the frame number of the start-frame is "1" with reference to the content-structure table 410, which means that the offset $K_1$ for the frame number is 1. Similarly, with reference to the content-structure table 410 and also to the index information 626, the offset $K_1$ for the byte location is 512.

Next, let the playback number n be 2-6 sequentially, and an offset $K_n$ is obtained by the expression $K_n=B_{n-1}-A_{n-1}+K_{n-1}$ (step S603). In the specific example, when the playback number n=2, the offset $K_2$ for the byte location is calculated below.

First, values regarding the immediately preceding scene, i.e., the scene having the playback number n−1, in the content-structure table 410 are obtained with reference to the index information 626. The byte location of the start-frame is "512" and the obtained value is denoted by $A_1$. Next, the byte location of the frame (frame number 18001) immediately following the end-frame (the frame number 18000) of the scene having the playback number 1 in the content-structure table 410 is obtained with reference to the index information 626. The byte location of the frame immediately following the end frame is "72000512", and the obtained value is denoted by $B_1$. Using these values, $K_n$ is obtained by the following expression.

$$K_n=B_{n-1}-A_{n-1}+K_{n-1}$$

Thus, $K_2$=72000512−512+512=72000000.

Note that steps S604-S609 described below are repeated for each playback number, and the steps S605-608 are repeated for each frame.

Next, a value of the frame number or the byte location regarding a currently subjected frame is obtained. The value is obtained with reference to the index information and the transmitting timing information both of a corresponding content. Then, the value $A_n$ is subtracted from the thus obtained value thereby to obtain a value C (step S606). Using the obtained value C, a desired value X of the frame number or the byte location regarding the currently subjected frame is obtained by the expression, $X=K_n+C$ (step S607).

Description is given by way of the specific example. To be obtained in the specific example is the byte location of the $19000^{th}$ frame in the virtual content shown in the content-structure table 410. With reference to the content-structure table 410, the $19000^{th}$ frame in the virtual content is the $18700^{th}$ frame of the content that is assigned the playback number 3 and identified by the content ID "Program 01.mp4". Let the playback number n=1, the offset $K_1$ of the byte location is obtained as follows.

$$K_1=512$$

Let the playback number n=2, the offset $K_2$ of the byte location is obtained by the following expression.

$$K_2 = B_1 - A_1 + K_1$$
$$= 72000512 - 512 + 512$$
$$= 72000512$$

Similarly, let the playback number n=3, the offset $K_3$ of the byte location is obtained by the following expression.

$$K_3 = B_2 - A_2 + K_2$$
$$= 1200512 - 512 + 72000512$$
$$= 73200512$$

Next, with reference to the index information 626, the byte location of the $18700^{th}$ frame in the original content is "74800112". Then, to obtain the value C, this value is subtracted from $A_3$="72000512", which is the byte location of the start-frame (18001) of the scene having the playback number n=3 in the content-structure table 410. Accordingly, the value C=279960.

Thus, the desired value X is obtained by the following expression.

$$X = K_3 + C$$
$$= 73200512 + 279960$$
$$= 76000112 \text{ (bytes)}$$

Lastly, since the transmitting timing has been uniquely set for each frame, reference is made to the transmitting timing information 627 or 637, which is of the original content corresponding to a currently subjected frame, and the transmitting timing of each frame contained in the content-structure table 410 is read and written (step S611).

In the case where there is no next frame to the currently subjected frame, the value $B_n$ takes on the value obtained by adding "1" to the currently subjected frame number when calculating the frame number, and the value corresponding to the file size that is shown in the original header information when calculating the byte location.

Second Preferred Embodiment

Hereinafter, description is given to a virtual content distribution system 2 as a second preferred embodiment of the present invention. The virtual content distribution system 2 is composed of a client 10a, the Internet 20, a Web server 30a, an agent 40a, a DB server 50a, a virtual content output server 60a, and a distribution server 70a. Note that the virtual content distribution system 2 is not illustrated. Further, the client 10a, the Web server 30a, the agent 40a, the DB server 50a, the distribution server 70a are all similar to their counterpart elements constituting the virtual content distribution system 1 in their constructions and functions. Thus description thereof is omitted.

Similarly to the virtual content output server 60 described in the first preferred embodiment, the virtual content output sever 60a is composed of a content storage unit 601a and a virtual content generating unit 602a. The virtual content generating unit 602a is composed of a content-structure table receiving unit 603a, a content-structure table interpreting unit 604a, a warning unit 605a, a content-structure table storage unit 606a, a content data reading unit 607a, a header information reading unit 608a, an additional information reading unit 609a, a content data processing unit 610a, a virtual content header information generating unit 611a, a virtual content additional information generating unit 612a, and a virtual content output unit 613a.

The virtual content header information generating unit 611a generates virtual content header information based on the content-structure table, and outputs the generated virtual content header information to the virtual content output unit 613a.

The virtual content additional information 612a generates, based on the content-structure table, virtual content additional information, namely virtual content index information and virtual content transmitting timing information. The virtual content additional information 612a then outputs the generated virtual content index information and virtual content transmitting timing information to the virtual content output unit 613a.

The content data reading unit 607a reads from contents stored in the content storage unit 601a a plurality of frames of the content data, based on the content-structure table. The content data reading unit 607a then outputs the read frames to the content data processing unit 610a.

The content data processing unit 610a conducts processing on the received frames, and outputs the processed frames to the virtual content output unit 613a.

The virtual content output unit 613a receives the plurality of frames together with the virtual content header information, the virtual content index information, and the virtual content transmitting timing information. The virtual content output unit 613a sequentially transmits the plurality of frames one by one at the timing shown by the virtual content transmitting timing information to the client 10a via the distribution server 70a and the Internet 20. In addition, the virtual content output unit 613a transmits the virtual content index information and the virtual content transmitting timing information to the client 10a via the distribution server 70a and the Internet 20.

<Recapitulation>

As set forth in the above description, the virtual content distribution system 1 according to the first embodiment, and the virtual content distribution system 2 according to the second embodiment are the systems for searching a database using a user-selected genre or keyword to retrieve scenes matching the user-selected genre or keyword, and distributes the retrieved scenes as, so to speak, a "user-specific program". Further, the virtual content distribution system 1 distributes the above "user-specific program" with CMs inserted therein. The CMs are also selected specifically to each user according to his attribute, such as gender and age.

In the virtual content distribution system 1 according to the first embodiment, the virtual content output server 60 reads parts of original content files, and transmits to the client 10 the read parts together with newly generated virtual content header information and newly generated virtual content additional information. Thus, the client 10 is allowed to download the transmitted parts of contents as if there existed a newly generated content file.

In the virtual content distribution system 2 according to the second embodiment, the virtual content output server 60a reads parts of original content files, and sequentially transmits, to the client 10a, the read parts on a frame-by-frame basis according to the virtual content transmitting timing information that is newly generated. In other words, the virtual content output server 60a is allowed to perform streaming type distribution as if there existed a newly generated content file.

Modifications

Up to this point, the present invention has been described by way of the preferred embodiments. The present invention however, is in no way limited to the specific embodiments disclosed above, and various modifications, including the ones described blow, are possible.

(1) In the above preferred embodiments, the index information 626, the index information 636, and the virtual content index information 661 are each composed of the frame numbers and byte locations. Yet, other types of information may be used instead of the byte locations as long as the information specifies where each frame is in a respective content. Such information includes the number of audio samples, the seconds, and the number of fields.

In addition, the content-structure table generated in the above preferred embodiments is composed of the playback numbers, the content IDs, the start-frame numbers, and the end-frame numbers. Alternatively, the start-frame numbers and the end-frame numbers may be other types of information, such as the number of bytes residing before specific scene in a respective content, as long as the information specifies a specific part of contents.

(2) In the above preferred embodiments, items of information received as the user profile information are "gender", "age", and "hobby". Yet, the profile information is not limited thereto. For example, the profile information may include information items such as "occupation" and "resident area", which may be useful when selecting suitable CMs.

(3) The scope of the present invention includes such a construction that the genre and keywords used to retrieve program scenes may be arbitrarily inputted by a user. Further, the scope of the present invention also includes such a construction that a plurality of keywords may be designated, and it may be selected as to whether to implement the logical AND operation or the logical OR operation using the selected keywords.

(4) According to the above preferred embodiments, the content-structure table generated by the agent 40 is transmitted to the output server 60 via the LAN. Alternatively, however, the transmission may be carried out using a recording medium such as a floppy disk, MO, and CD-ROM.

(5) In the above preferred embodiments, the Web server 30, the agent 40, the DB server 50, the virtual content output server 60, and the distribution server 70 are mutually connected via the LAN. Yet, these elements may be mutually connected via the Internet without departing from the scope of the present invention.

(6) In the above preferred embodiments, the virtual content is composed of programs and CMs that are alternately arranged. Yet, CMs may be inserted into the virtual content in a different arrangement. For example, the ratio of CMs to the programs may be set according to a user request, or CMs may be collectively inserted at the beginning or the end of the virtual content. The scope of the present includes various patters of CM insertion.

Figure 27:
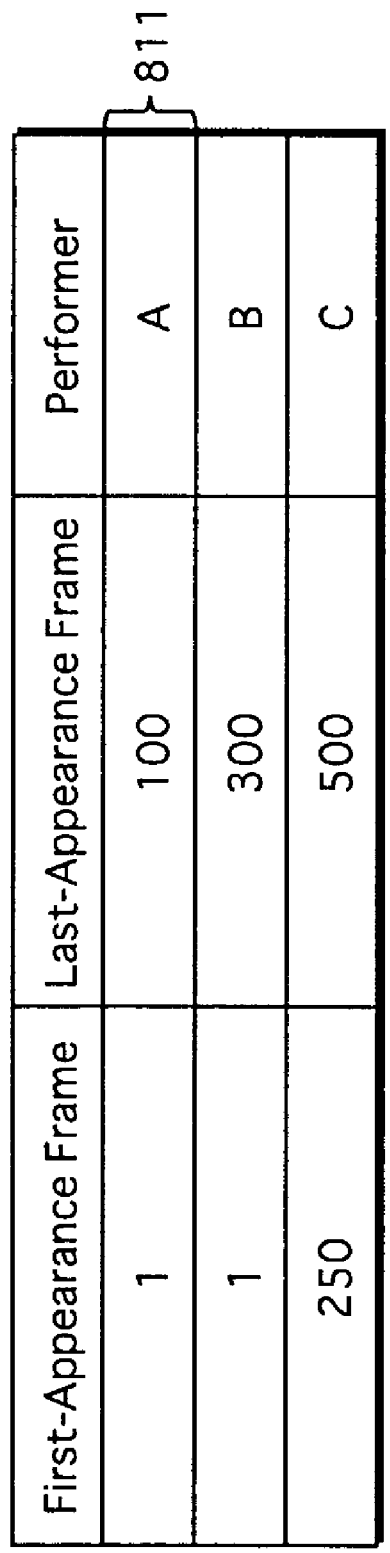
FIG. 27 is a view showing the data structure of performer information 801.

(7) In the above preferred embodiments, the additional information includes index information and transmitting timing information. Yet, the additional information according to the present invention is not limited thereto. For example, the additional information may be metadata regarding performers appearing in the program as shown in FIG. 27. The performer information 801 shows the frame numbers of a first-appearance frame in which a performer makes his first appearance in the program and of a last-appearance frame in which the performer makes his last appearance in the program. The piece of performer information 811 shows that the performer A appears in the program from the frames number 1 through 100.

(8) The scope of the present invention includes distribution of a series of scenes made out of only some of the scenes matching the user selected keyword, rather than all the scenes matching the user selected keyword.

(9) The profile information used to select CM scenes to be distributed does not have to be inputted by users. Instead, the profile information may be automatically generated and updated at an distribution end using past history reading each user.

(10) Regarding each content, a time period allowing its distribution may be set, and the content-structure table may be generated with reference to the set periods.

(11) The present invention may be embodied as a method described above, or a computer program implementing the above method by a computer, or even as digital signals representing the above computer program.

Further, the present invention may be embodied as a computer-readable medium storing the computer program or the digital signals. Here, the computer readable medium is, for example, a floppy disk, a hard disk, CD-ROM, MO, DVD, DVD-ROM, DVD-RAM, or semiconductor memory. Alternatively, the computer program or the digital signals stored on such recording medium as above may be transmitted via a telecommunications network, a wired or wireless communications line, a network exemplified by the Internet, or the like.

Still further, the present invention may be embodied as a computer system provided with a microprocessor and memory that stores the above computer program, so that the microprocessor operates in accordance with the program.

Still further, the computer program or the digital signals may be recorded on any of the above recording medium and transported to another location. Alternatively, the computer program or the digital signals may be transmitted via any of the above networks, so that the computer program or the digital signals may be executed by another, independent computer system.

(12) Further, the present invention may be embodied as any combination of the above preferred embodiments and the above modifications.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A content distribution system comprising:
 a server device for selecting and distributing video scenes according to a user request; and
 a terminal device for receiving the video scenes from the server device, wherein:
 the server device includes:
  a storing unit operable to store a plurality of content files, each content file containing (i) pieces of scene data, and (ii) pieces of index information, each piece of index information being in one-to-one correspondence with a piece of scene data, each piece of scene data including pieces of frame data, and each piece of index information identifying a frame number and a frame location of each piece of frame data included in a corresponding piece of scene data;
  a selecting unit operable to select, from the content files, pieces of scene data matching the user request;
  a calculating unit operable to
   read, from the storing unit, pieces of the index information which correspond to the selected pieces of scene data,
   generate a virtual content file containing the selected pieces of scene data,
   calculate, based on the read pieces of index information and without re-encoding the selected pieces of scene data, (i) a frame number and (ii) one of a read location and a byte location of each piece of frame data of the selected pieces of scene data contained in the generated virtual content file, each frame number indicating a frame number in relation to a beginning of the generated virtual content file and each read location or byte location indicating a location relative to the beginning of the generated virtual content file, and
   generate selected-scene index information identifying, in relation to the generated virtual content file, the calculated frame number and the calculated read location or byte location of each piece of frame data of the selected pieces of scene data contained in the generated virtual content file, the selected-scene index information for allowing playback of the selected pieces of scene data in a correct playback order; and
  a transmitting unit operable to transmit, as a virtual content file, the selected pieces of scene data associated with the generated selected-scene index information to the terminal device; and
 the terminal device includes:
  a storage unit operable to receive the selected pieces of scene data and the selected-scene index information and store, as a virtual content file, the received pieces of scene data and selected-scene index information; and
  a playback unit operable to execute normal playback and trickplay playback of the virtual content file containing the received pieces of scene data, by referencing the received selected-scene index information.

2. A server device for selecting and distributing video scenes according to a user request received from a terminal device, the server device comprising:
 a storing unit operable to store a plurality of content files, each content file containing (i) a plurality of pieces of scene data, and (ii) a plurality of pieces of index information, the pieces of index information being in one-to-one correspondence with the pieces of scene data, each piece of scene data including a plurality of pieces of frame data, and each piece of index information identifying a frame number and a frame location of each piece of frame data included in a corresponding piece of scene data;
 a selecting unit operable to select, from the content files, pieces of scene data matching the user request;
 a calculating unit operable to
  read, from the storing unit, pieces of the index information which correspond to the selected pieces of scene data,
  generate a virtual content file containing the selected pieces of scene data,
  calculate, based on the read pieces of index information and without re-encoding the selected pieces of scene date, (i) a frame number and (ii) one of a read location and a byte location of each piece of frame data of the selected pieces of scene data contained in the generated virtual content file, each frame number indicating a frame number relative to a beginning of the generated virtual content file and each read location or byte location indicating a location relative to the beginning of the generated virtual content file, and generate selected-scene index information identifying, in relation to the virtual content file, the calculated frame number and the calculated read location or byte location of each piece of frame data of the selected pieces of scene data contained in the generated virtual content file, the selected-scene index information for allowing playback of the selected pieces of scene data in a correct playback order; and a transmitting unit operable to transmit, as a virtual content file, the selected pieces of scene data associated with the generated selected-scene index information to the terminal device.

3. The server device according to claim 2, wherein:

each piece of scene data stored in the storing unit is identified by a scene ID; and the selecting unit includes:

a database sub-unit operable to store, for each piece of scene data stored in the storing unit, a scene ID in association with a corresponding piece of scene-related information;

a request receiving sub-unit operable to receive, as the user request from the terminal device, a selection condition; and a scene selecting sub-unit operable to extract from the scene IDs stored in the database sub-unit, scene IDs that correspond to each piece of corresponding scene-related information matching the selection condition, and operable to obtain, from the storing unit, pieces of scene data identified by the extracted scene IDs.

4. The server device according to claim 3, wherein:

the scene selecting sub-unit serially assigns, to the extracted scene IDs, playback numbers indicating the playback order, and generates a structure table composed of the playback numbers and the extracted scene IDs; and the scene selecting sub-unit is operable to obtain the pieces of scene data with reference to the generated structure table.

5. The server device according to claim 2, wherein:

the storing unit further stores a plurality of pieces of timing information, the pieces of timing information being in one-to-one correspondence with the pieces of scene data, each piece of timing information identifying a transmission timing of each piece of frame data included in a corresponding piece of scene data in association with a corresponding frame number; and the calculating unit further extracts a transmission timing for each piece of frame data contained in the generated virtual content file, and further generates selected-scene timing information identifying, in relation to the generated virtual content file, the calculated frame number and the extracted transmission timing of each piece of frame data of the selected pieces of scene data contained in the generated virtual content file in association with each other.

6. A server device controlling method for use with a server device that selects and transmits video scenes according to a user request received from a terminal device, the server device storing a plurality of content files, each content file containing (i) a plurality of pieces of scene data, and (ii) a plurality of pieces of index information, the pieces of index information being in one-to-one correspondence with the pieces of scene data, each piece of scene data including a plurality of pieces of frame data, and each piece of index information identifying a frame number and a frame location of each piece of frame data included in the corresponding piece of scene data, the server device controlling method comprising:

selecting, from the content files, pieces of scene data matching the user request;

reading, from the server device, pieces of the index information which correspond to the selected pieces of scene data;

generating a virtual content file containing the selected pieces of scene data;

calculating, based on the read pieces of index information and without re-encoding the selected pieces of scene data, (i) a frame number and (ii) one of a read location and a byte location of each piece of frame data of the selected pieces of scene data contained in the generated virtual content file, each frame number indicating a frame number relative to a beginning of the generated virtual content file and each read location or byte location indicating a location relative to the beginning of the generated virtual content file;

generating selected-scene index information identifying, in relation to the virtual content file, the calculated frame number and the calculated read location or byte location of each piece of frame data of the selected pieces of scene data contained in the generated virtual content file, the selected-scene index information for allowing playback of the selected pieces of scene data in a correct playback order; and transmitting, as a virtual content file, the selected pieces of scene data associated with the generated selected-scene index information to the terminal device.

7. A computer-readable recording medium having a server device controlling program recorded thereon, the server device controlling program for use with a server device that selects and distributes video scenes according to a user request received from a terminal device, the server device storing a plurality of content files, each content file containing (i) a plurality of pieces of scene data, and (ii) a plurality of pieces of index information, the pieces of index information being in one-to-one correspondence with the pieces of scene data, each piece of scene data including pieces of frame data, and each piece of index information identifying a frame number and a frame location of each piece of frame data included in the corresponding piece of scene data, the server device controlling program causing the server device to execute a method comprising:

selecting, from the content files, pieces of scene data matching the user request;

reading, from the server device, pieces of the index information which correspond to the selected pieces of scene data;

generating a virtual content file containing the selected pieces of scene data;

calculating, based on the read pieces of index information and without re-encoding the selected pieces of scene data, (i) a frame number and (ii) one of a read location and a byte location of each piece of frame data of the selected pieces of scene data contained in the generated virtual content file, each frame number indicating a frame number relative to a beginning of the generated virtual content file and each read location or byte location indicating a location relative to the beginning of the generated virtual content file;

generating selected-scene index information identifying, in relation to the virtual content file, the calculated frame number and the calculated read location or byte location of each piece of frame data of the selected pieces of scene data contained in the generated virtual content file, the selected-scene index information for allowing playback of the selected pieces of scene data in a correct playback order; and transmitting, as a virtual content file, the selected pieces of scene data associated with the generated selected-scene index information to the terminal device.

8. A virtual content output device for outputting a virtual content file according to a content-structure table, the content-structure table specifying a playback order of a plurality of content files, the virtual content output device comprising:

a content storing unit operable to store the plurality of content files, each content file containing (i) header information identifying a size of the content file and a total number of pieces of frame data included in the content file, (ii) a plurality of pieces of scene data, each piece of scene data including a plurality of pieces of content data, and (iii) a plurality of pieces of additional information, the pieces of additional information being in one-to-one correspondence with the pieces of scene data, and each piece of additional information including (i) index information identifying a byte location of each piece of frame data included in the corresponding piece of scene data, the byte location being a location relative to a beginning of the content file containing the scene data, and (ii) transmission timing information identifying a timing according to which each piece of frame data included in the corresponding piece of scene data is to be transmitted;

a content-structure table receiving unit operable to receive the content-structure table;

a content-structure table storing unit operable to store the content-structure table received by the content-structure table receiving unit;

a content data processing unit operable to (i) provide an instruction to read content data according to the content-structure table stored in the content-structure table storing unit, and (ii) process pieces of frame data included in the read content data by overwriting, without re-encoding the content data, a frame number and a playback time of each piece of frame data with a frame number and a playback time of a respective piece of frame data of the virtual content file;

a content data reading unit operable to read, from the content storing unit, the content data according to the instruction provided from the content data processing unit, and operable to output the read content data to be received by the content data processing unit as the received content data;

a virtual content header information generating unit operable to (i) provide an instruction to read header information according to the content-structure table stored in the content-structure table storing unit, (ii) calculate, without re-encoding the content data, a file size of the virtual content file and a total number of pieces of frame data contained in the virtual content file, and (iii) generate virtual content header information from received header information, the virtual content header information identifying the calculated size of the virtual content file and the calculated total number of pieces of frame data included in the virtual content file;

a header information reading unit operable to read, from the content storing unit, the header information according to the instruction provided by the virtual content header information generating unit, and operable to output the read header information to be received by the virtual content header information generating unit as the received header information; and a virtual content output unit operable to output, as a virtual content file, the content data processed by the content data processing unit and the virtual content header information generated by the virtual content header information generating unit, the output received content data and virtual content header information being associated with each other.

9. A virtual content output device for outputting a virtual content file according to a content-structure table, the content-structure table specifying a playback order of a plurality of content files, the virtual content output device comprising:

a content storing unit operable to store the plurality of content files, each content file containing (i) header information identifying a size of the content file and a total number of pieces of frame data included in the content file, (ii) a plurality of pieces of scene data, each piece of scene data including a plurality of pieces of content data, and (iii) a plurality of pieces of addition information, the pieces of additional information being in one-to-one correspondence with the pieces of scene data, and each piece of additional information including (i) index information identifying a byte location of each piece of frame data included in the corresponding piece of scene data, the byte location being a location relative to a beginning of the content file containing the scene data, and (ii) transmission timing information identifying a timing according to which each piece of frame data included in the corresponding piece of scene data is to be transmitted;

a content-structure table receiving unit operable to receive the content-structure table;

a content-structure table storing unit operable to store the content-structure table received by the content-structure table receiving unit;

a content data processing unit operable to (i) provide an instruction to read content data according to the content-structure table stored in the content-structure table storing unit, and (ii) process pieces of frame data included in the read content data by overwriting, without re-encoding the content data, a frame number and a playback time of each piece of frame data with a frame number and a playback time of a respective piece of frame data of the virtual content file;

a content data reading unit operable to read, from the content storing unit, the content data according to the instruction provided from the content data processing unit, and operable to output the read content data to be received by the content data processing unit as the received content data;

a virtual content header information generating unit operable to (i) provide an instruction to read header information according to the content-structure table stored in the content-structure table storing unit, (ii) calculate, without re-encoding the content data, a file size of the virtual content file and a total number of pieces of frame data contained in the virtual content file, and (iii) generate virtual content header information from received header information, the virtual content header information identifying the calculated size of the virtual content file and the calculated total number of pieces of frame data included in the virtual content file;

a header information reading unit operable to read, from the content storing unit, the header information according to the instruction provided by the virtual content header information generating unit, and operable to output the read header information to be received by the virtual content header information generating unit as the received header information;

a virtual content additional information generating unit operable to (i) provide an instruction to read additional information according to the content-structure table stored in the content-structure table storing unit, and (ii) generate, without re-encoding the content data, virtual content additional information from received additional information, the virtual content additional information including index information identifying, in relation to the virtual content file, a byte location of each piece of frame data included in the virtual content file, the byte location being a location relative to a beginning of the virtual content file, and the virtual content additional information including a transmission timing identifying a timing according to which each piece of frame data included in the corresponding piece of scene data of the virtual content file is to be transmitted;

an additional information reading unit operable to read, from the content storing unit, the additional information according to the instruction provided by the virtual content additional information generating unit, and operable to output the read additional information to be received by the virtual content additional information generating unit as the received additional information; and a virtual content output unit operable to output, as a virtual content file, the received content data processed by the content data processing unit, and the virtual content header information generated by the virtual content header information generating unit, and output the virtual content additional information generated by the virtual content additional information generating unit, the output received content data, the virtual content header information, and the virtual content additional information being associated with each other.

* * * * *